US012583653B2

(12) United States Patent
Olofsson et al.

(10) Patent No.: US 12,583,653 B2
(45) Date of Patent: Mar. 24, 2026

(54) TANK BREATHER CAP WITH INTEGRATED FILTER, SPLASH PROTECTION, AND NIPPLE FOR BREATHER HOSE

(71) Applicant: Advanced Suspension Technology LLC, Northville, MI (US)

(72) Inventors: Carl Olofsson, St. Truiden (BE); Kenneth Llonch, Hasselt (BE)

(73) Assignee: Advanced Suspension Technology LLC, Northville, MI (US)

( * ) Notice: Subject to any disclaimer, the term of this patent is extended or adjusted under 35 U.S.C. 154(b) by 86 days.

(21) Appl. No.: 18/594,261

(22) Filed: Mar. 4, 2024

(65) Prior Publication Data

US 2025/0276835 A1     Sep. 4, 2025

(51) Int. Cl.
B60K 15/035 (2006.01)
B65D 51/16 (2006.01)
B60K 15/03 (2006.01)

(52) U.S. Cl.
CPC ........ B65D 51/16 (2013.01); B01D 2265/028 (2013.01); B60K 2015/03236 (2013.01); B60K 15/035 (2013.01)

(58) Field of Classification Search
CPC .......... B01D 2279/35; B01D 2201/291; B01D 2271/00; B01D 2265/028; B60K 15/035; B60K 15/0406; B60K 15/03519; B60K 2015/03547; B60K 2015/03236; B60K 2015/03542; F01M 11/04; F01M 13/0405;

(Continued)

(56) References Cited

U.S. PATENT DOCUMENTS 2,603,308 A * 7/1952 Mccall ............... B60K 15/0406
                                                                220/372
2,650,673 A * 9/1953 Bering ................... B65D 51/28
                                                                220/371

(Continued)

FOREIGN PATENT DOCUMENTS

CN        203730420 U      7/2014
CN        117386678 A      1/2024

(Continued)

OTHER PUBLICATIONS

International Search Report and Written Opinion of the ISA issued in PCT/US2025/012644, mailed May 14, 2025 ISA/US.

*Primary Examiner* — Gideon R Weinerth
(74) *Attorney, Agent, or Firm* — Harness, Dickey & Pierce, P.L.C.

(57)     ABSTRACT

A hydraulic fluid tank assembly for use with a suspension system for a vehicle is provided. The hydraulic fluid tank assembly includes a tank having a chamber configured to contain a volume of hydraulic fluid and a volume of gas, and a breather cap assembly. The breather cap assembly includes a breather cap having a passageway and a recess, a filter having one or more openings configured to permit gas to pass therethrough, and a splash guard coupled to the breather cap, the splash guard retaining the filter in the recess of the breather cap, and the splash guard having a distal opening. The passageway of the breather cap, the openings of the filter, and the distal opening of the splash guard are fluidly connected and configured to permit gas to pass therethrough to and from the chamber of the tank and the atmosphere.

7 Claims, 13 Drawing Sheets

(58) Field of Classification Search
CPC ....... F01M 13/0416; F01M 2013/0438; F01M
2013/0488; F01M 2013/0433
USPC .... 55/502, 505, 507; 60/487, 585, 478, 453,
60/584; 210/282; 215/261, 307;
220/202, 374, 373, 367.1, 370, 371
See application file for complete search history.

(56) References Cited

U.S. PATENT DOCUMENTS

| | | | | | |
|---|---|---|---|---|---|
| 2,675,093 | A | * | 4/1954 | Mccall | F16L 55/1125 55/486 |
| 3,218,785 | A | * | 11/1965 | La Vern | F02M 35/0203 55/503 |
| 3,622,033 | A | * | 11/1971 | Butler | F16N 21/06 55/510 |
| 3,961,724 | A | * | 6/1976 | Kapsy | B60K 15/0406 220/374 |
| 4,190,087 | A | * | 2/1980 | Herman | B65D 59/06 138/96 T |
| 4,401,093 | A | * | 8/1983 | Gates, Jr | F01M 13/0405 123/573 |
| 4,838,901 | A | * | 6/1989 | Schmidt | B01D 46/30 95/287 |
| 5,113,836 | A | * | 5/1992 | Sweeten | F01M 9/02 123/573 |
| 5,509,949 | A | * | 4/1996 | Gluys | F16H 57/027 74/606 R |
| 6,398,838 | B1 | * | 6/2002 | Kaffenberger | B01D 29/96 55/508 |
| 6,585,128 | B2 | | 7/2003 | Clevenger et al. | |
| 6,745,565 | B1 | * | 6/2004 | Wahner | F15B 1/26 60/487 |
| 8,122,713 | B2 | | 2/2012 | Pepe et al. | |
| 8,197,012 | B2 | * | 6/2012 | L'Aot | B60T 17/06 137/574 |
| 8,454,719 | B2 | * | 6/2013 | Tesner | F16H 57/027 55/385.3 |
| 8,757,417 | B2 | * | 6/2014 | Neumann | B60T 11/22 220/361 |
| 9,096,124 | B2 | * | 8/2015 | Whelan | B60K 15/0406 |
| 9,573,461 | B2 | * | 2/2017 | Sonderegger | B01D 46/2403 |
| 11,009,115 | B2 | * | 5/2021 | Hugues | F16H 57/027 |
| 2006/0081634 | A1 | * | 4/2006 | Moessinger | B60K 15/035 220/371 |
| 2014/0150388 | A1 | * | 6/2014 | Girondi | B01D 46/0005 55/504 |
| 2015/0135666 | A1 | | 5/2015 | Holzwarth et al. | |
| 2015/0231964 | A1 | * | 8/2015 | Sonderegger | B60K 15/035 55/332 |
| 2019/0060799 | A1 | * | 2/2019 | Banju | B01D 46/0012 |
| 2024/0308330 | A1 | * | 9/2024 | Buratto | F16K 15/148 |
| 2025/0205625 | A1 | * | 6/2025 | Sampathkumar | B01D 46/52 |

FOREIGN PATENT DOCUMENTS

| | | |
|---|---|---|
| EP | 1647320 B1 | 7/2007 |
| JP | 2000038039 A | 2/2000 |
| WO | 2022169806 A1 | 8/2022 |

* cited by examiner

TANK BREATHER CAP WITH INTEGRATED FILTER, SPLASH PROTECTION, AND NIPPLE FOR BREATHER HOSE

FIELD

The present disclosure relates generally to suspension systems for motor vehicles and more particularly to hydraulic fluid tank and breather cap assemblies used with various suspension systems.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during cornering (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers.

Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not needed. Some vehicles do have stabilizer bar/anti-roll bar disconnects that may be manually or electronically actuated, but the complexity and costs associated with these systems make them ill-suited for most vehicle applications. Packaging constraints also limit the ability to provide mechanical systems that effectively limit fore and aft pitch.

In an effort to augment or replace traditional mechanical stabilizer bars/anti-roll bars, anti-roll suspension systems are being developed that include one or more dampers that be independently actuated via one or more fluidly-connected pumps, wherein the pump(s) can produce a pressure change in the damper(s). In some suspension systems, there is one pump per damper, whereas in other suspension systems, there is one pump per two or more dampers. Additionally, other anti-roll suspension systems are being developed that hydraulically connect two, or more dampers in a hydraulic circuit where the extension of one damper produces a pressure change in the other damper(s) in the hydraulic circuit that makes it more difficult to compress the other damper(s) in the hydraulic circuit. The pressure changes in the damper(s) increases the roll and pitch stiffness of the suspension system of the vehicle. As stated herein these suspension systems use pumps to generate the pressure changes in the dampers and the active forces exerted by the dampers. The flow or the speed of the pump is controlled to generate a requested pressure which is translated to a force by the damper.

The pumps rely on a source of hydraulic fluid, which is contained in a hydraulic fluid tank onboard the vehicle. The hydraulic fluid volume can in some instances be large, and therefore, the hydraulic fluid tank needs to be ventilated to atmospheric pressure. Otherwise, the tank would become a pressure vessel with high pressure when an amount of hydraulic fluid is pumped into or out of the tank. Accordingly, such hydraulic fluid tanks are provided with a breather that allows the interior of the tank to be open to the environment. However, the breather needs to have a filter to protect the hydraulic fluid from contamination. If contamination gets into the hydraulic fluid inside the tank, there is a risk that the contamination will reduce the performance of the suspension system.

Accordingly, there is a need for a suspension system that includes a breather that better protects the hydraulic fluid in the tank from contamination.

SUMMARY

This section provides a general summary of the disclosure, and is not a comprehensive disclosure of its full scope or all of its features.

In accordance with one aspect of the subject disclosure, a hydraulic fluid tank assembly for a suspension system for a vehicle is provided. The hydraulic fluid tank assembly includes a tank and a breather cap assembly. The breather cap assembly has a low restriction so that over/under pressure is not created in the tank when hydraulic fluid is pumped into or out of the tank. The breather cap assembly includes a breather cap, a filter, and a splash guard. The filter protects the hydraulic fluid in the tank from contamination entering the tank through the breather assembly. The breather cap assembly may further include an attachment point for a breather hose, wherein the outlet/inlet of the breather hose is positioned on the vehicle such that the inlet/outlet of the breather hose is always above the maximum water wading depth of the vehicle. When the vehicle is driving in extreme conditions, for example up and/or down steep inclines, off-road, or on racetracks, the hydraulic fluid sloshes around in the tank. The splash guard is located between the filter and the hydraulic fluid in the tank. The splash guard reduces or prevents the potential for hydraulic fluid to splash and contact the filter. The splash guard also retains the filter in the breather cap.

In accordance with another aspect of the subject disclosure, a hydraulic fluid tank assembly for use with suspension system of a vehicle is provided. The hydraulic fluid tank assembly includes a tank and a breather cap assembly releasably coupled to the tank. The tank has a chamber configured to contain a volume of hydraulic fluid and a volume of gas. The breather cap assembly includes a breather cap, the breather cap having a passageway and a recess, a filter, the filter having one or more openings configured to permit gas to pass therethrough, and a splash guard coupled to the breather cap, the filter disposed between the splash guard and the breather cap, the splash guard retaining the filter in the recess of the breather cap, and the splash guard having a distal opening. The passageway of the breather cap, the openings of the filter, and the distal opening of the splash guard are fluidly connected and configured to permit gas to pass therethrough to and from the chamber of the tank and the atmosphere.

In accordance with another aspect of the subject disclosure, a hydraulic fluid tank assembly for use with suspension system of a vehicle is provided. The hydraulic fluid tank assembly includes a tank and a breather cap assembly releasably coupled to the tank. The tank has a chamber configured to contain a volume of hydraulic fluid and a volume of gas. The breather cap assembly includes a breather cap, a filter, and a splash guard. The breather cap includes a base having a first side and a second side opposite the first side, an outer cylindrical skirt extending a first distance from the second side of the base away from the first side, an inner side of the outer cylindrical skirt having a retaining feature adapted to releasably couple the breather cap to the tank, an inner cylindrical skirt extending a second distance from the second side of the base away from the first side, the second distance less than the first distance, and a passageway extending through the base. The filter has one or more openings configured to permit gas to pass therethrough. The splash guard has a distal opening and is coupled to the inner cylindrical skirt of the breather cap, with the filter disposed between the splash guard and the breather cap. The passageway of the breather cap, the openings of the filter, and the distal opening of the splash guard fluidly connected and configured to permit gas to pass therethrough to and from the chamber of the tank and the atmosphere.

In accordance with another aspect of the subject disclosure, a hydraulic fluid tank assembly for use with a suspension system for a vehicle is provided. The hydraulic fluid tank assembly includes a tank, the tank having a chamber configured to contain a volume of hydraulic fluid and a volume of gas, and a breather cap assembly releasably coupled to the tank. The breather cap assembly includes a breather cap, a filter, and a splash guard. The breather cap includes a base having a first side and a second side opposite the first side, a cylindrical skirt extending from the second side of the base and away from the first side, the cylindrical skirt having a first outer side, a second inner side, and a shoulder on the second inner side of the cylindrical skirt, the shoulder located a distance from the second side of the base, one or more grooves on the second inner side of the cylindrical skirt, the one or more grooves proximate to the shoulder, and a passageway extending through the base from the first side of the base to the second side of the base. The filter includes a filter edge finishing and a filter element, the filter edge finishing in contact with the shoulder of the breather cap, the filter configured to permit gas to pass therethrough. The splash guard is coupled to the breather cap, with the filter disposed between the splash guard and the breather cap. The splash guard includes a circular base having a first side and a second side opposite the first side, one or more tabs extending radially from circular base, the one or more tabs located in the one or more grooves of the breather cap, a guard portion extending from the second side of the base away from the first side, the guard portion extending toward the chamber of the tank, and a distal opening extending through the guard portion.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
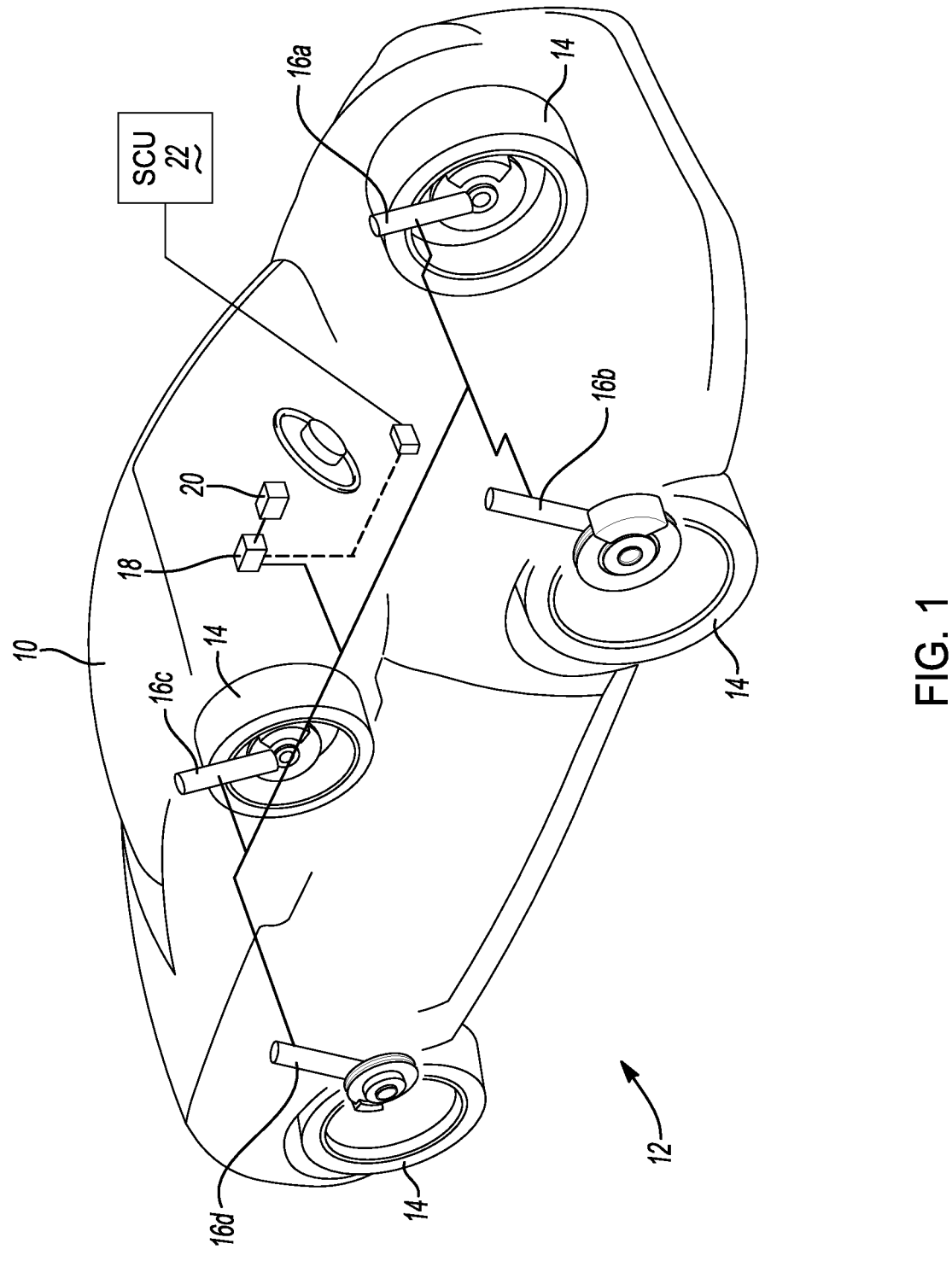
FIG. 1 is an illustration of an exemplary vehicle equipped with a suspension system in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exemplary vehicle 10 is illustrated that has been equipped with a suspension system 12 of the present disclosure. The vehicle 10 in FIG. 1 has been illustrated as an automobile; however, it should be appreciated that the suspension system 12 described herein is not limited to automobiles and may be used in other types of vehicles. In the illustrated example, the vehicle 10 has four wheels 14; however, it should be appreciated that the vehicle 10 may have fewer or greater than four wheels. Similarly, the suspension system 12 of the vehicle 10 includes a plurality of dampers 16a-16d, with one damper 16a-16d per wheel 14, including a front left damper 16a, a front right damper 16b, a back left damper 16c, and a back right damper 16d. While it should be appreciated that the suspension system 12 described herein may include a different number of dampers than those shown in the drawings, in most automotive applications, four dampers are used at each corner of a vehicle to control vertical movements of the front and rear wheels of the vehicle. Thus, the front left damper 16a controls (e.g., dampens) up and down (i.e., vertical) movements of the front left wheel 14 of the vehicle 10, the front right damper 16b controls (e.g., dampens) up and down (i.e., vertical) movements of the front right wheel 14 of the vehicle, the back left damper 16c controls (e.g., dampens) up and down (i.e., vertical) movements of the back left wheel of the vehicle 10, and the back right damper 16d controls (e.g., dampens) up and down (i.e., vertical) movements of the back right wheel of the vehicle 10.

The suspension system 12 of the vehicle 10 also includes a pump assembly 18 and a hydraulic fluid tank assembly 20. The pump assembly 18, is fluidly connected to the hydraulic fluid tank assembly 20, the front left damper 16a, the front right damper 16b, the back left damper 16c, and the back right damper 16d. Although the suspension system 12 in FIG. 1 is shown having a single pump assembly 18 and a single hydraulic fluid tank assembly 20, it should be appreciated that in some embodiments, the suspension system 12 may include two pump assemblies 18 and two hydraulic fluid tank assemblies 20, comprising a front pump assembly 18 fluidly connected to a front hydraulic fluid tank assembly 20, the front left damper 16a, and the front right damper 16b and a back pump assembly 18 fluidly connected to a back hydraulic fluid tank assembly 20, the back left damper 16c, and the back right damper 16d. In other embodiments, the suspension system 12 may include two pump assemblies, comprising a first pump assembly 18 fluidly connected to a first hydraulic fluid tank assembly 20, the front left damper 16a, and the back right damper 16d and a second pump assembly 18 fluidly connected to a second hydraulic fluid tank assembly 20, the front right damper 16b, and the back left damper 16c. In yet other embodiments, the suspension system 12 may include four pump assemblies 18 and four hydraulic fluid tank assemblies 20, with one pump assembly 18 and hydraulic fluid tank assembly 20 per damper 16a-16d.

The fluid pressure in the dampers 16a, 16b, 16c, 16d can be dynamically adjusted by the pump assembly 18 to dynamically adjust the roll stiffness of the vehicle 10 and can be used to either augment or completely replace mechanical stabilizer bars/anti-roll bars. Such mechanical systems require relatively straight, unobstructed runs between each of the front dampers 16*a*, 16*b* and each of the back dampers 16*c*, 16*d*. Accordingly, the suspension system 12 disclosed herein offers packaging benefits because the dampers 16*a*, 16*b*, 16*c*, 16*d* do not need to be mechanically connected.

In the illustrated embodiment, the dampers 16*a*, 16*b*, 16*c*, 16*d* are identical; however, other configurations are possible where the front dampers 16*a*, 16*b* differ from the rear dampers 16*c*, 16*d*.

The suspension system 12 also includes a suspension control unit (SCU) 22 that includes one or more processors or controllers configured to execute computer programs to control the suspension system 12 by implementing the control methods described below and memory that is programmed with the aforementioned computer programs and control methods. The suspension control unit (SCU) 22 is configured, for example, to control the pump assembly 18 to pump hydraulic fluid into and/or out of the dampers 16*a*, 16*b*, 16*c*, 16*d* and hydraulic fluid tank assembly 20.

Figure 2:
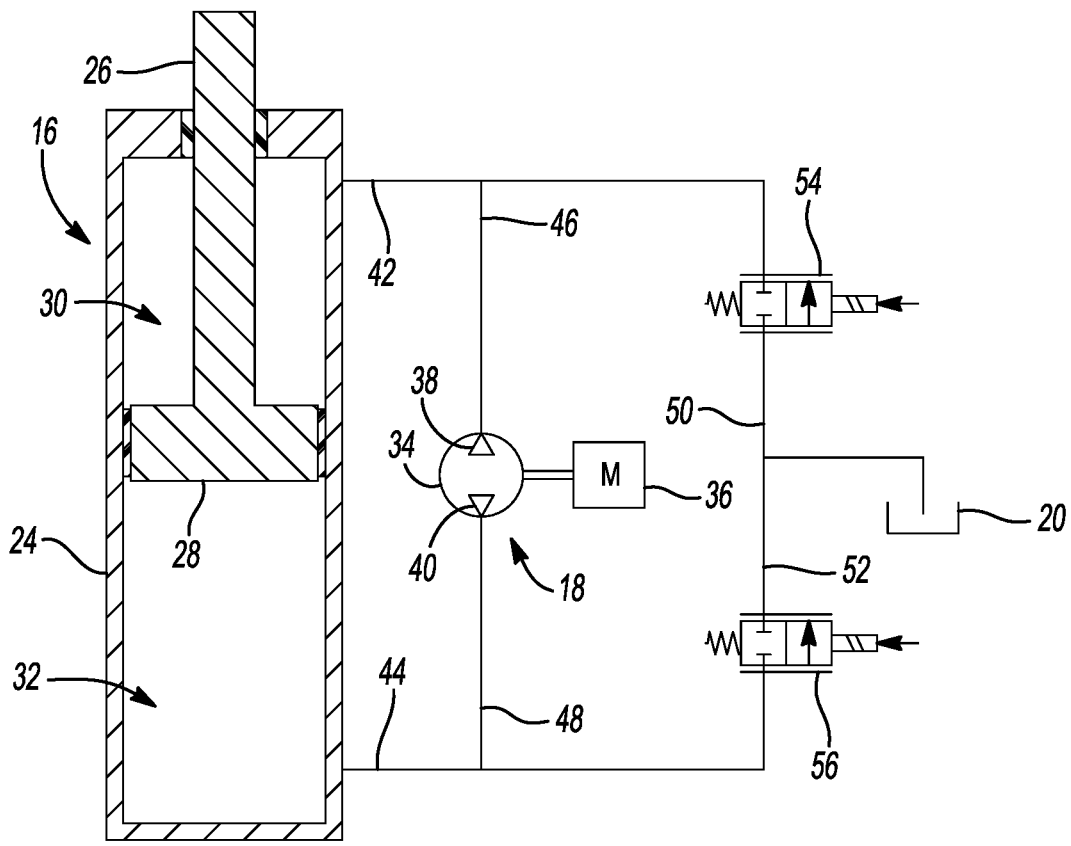
FIG. 2 is a schematic diagram illustrating a portion of the suspension system in accordance with the teachings of the present disclosure.

With reference to FIG. 2, additional details of the suspension system 12 are described with respect to a single damper 16, a single pump assembly 18, and a single hydraulic fluid tank assembly 20; however, it should be understood that the description with respect to the single damper 16 applies to the dampers 16*a*, 16*b*, 16*c*, 16*d*. The damper 16 is fluidly connected to the pump assembly 18 and the hydraulic fluid tank assembly 20. The damper 16 includes a damper housing 24, a piston rod 26, and a piston 28 that is mounted on the piston rod 26. The piston 28 is arranged in sliding engagement with the inside of the damper housing 24 such that the piston 28 divides the damper housing 24 into a first working chamber 30 and a second working chamber 32.

The pump assembly 18*a* includes a pump 34 and a pump motor 36. The pump 34 has a first pump port 38 and a second pump port 40. The pump 34 is a bi-directional pump driven by the pump motor 36.

The suspension system 12 further includes a plurality of hydraulic lines 42, 44, 46, 48, 50, and 52 fluidly connecting the pump 34, the hydraulic fluid tank assembly 20, the first working chamber 30, and the second working chamber 32. For example, the first pump port 38 is fluidly connected to the first working chamber 30 of the damper 16 by the first hydraulic line 42 and the third hydraulic line 46, and the second pump port 40 is fluidly connected to the second working chamber 32 of the damper 16 by the second hydraulic line 44 and the fourth hydraulic line 48. The first hydraulic line 42 and the third hydraulic line 46 are fluidly connected to one another. The second hydraulic line 44 and the fourth hydraulic line 48 are fluidly connected to one another. Although the first hydraulic line 42 and the third hydraulic line 46 are referenced as two hydraulic lines, it will be understood that in some embodiments, the first hydraulic line 42 and the third hydraulic line 46 are a single hydraulic line. Additionally, although the second hydraulic line 44 and the fourth hydraulic line 48 are referenced as two hydraulic lines, it will be understood that in some embodiments, the second hydraulic line 44 and the fourth hydraulic line 48 are a single hydraulic line.

Additionally, the first working chamber 30, the first pump port 38, and the hydraulic fluid tank assembly 20 are fluidly connected to one another by the first hydraulic line 42, the third hydraulic line 46, and the fifth hydraulic line 50. The second working chamber 32, the second pump port 40, and the hydraulic fluid tank assembly 20 are fluidly connected to one another by the second hydraulic line 44, the fourth hydraulic line 48, and the sixth hydraulic line 52. It should be appreciated that the hydraulic lines 42, 44, 46, 48, 50, and 52 may be constructed from rigid line, flexible tubing, hoses, integrated into the pump assembly 18 or dampers 16, or the like.

The suspension system 12 further includes a first valve 54 and a second valve 56. The first valve 54 is fluidly connected with the pump 34, the hydraulic fluid tank assembly 20, and the first working chamber 30. The second valve 56 is fluidly connected with the pump 34, the hydraulic fluid tank assembly 20, and the second working chamber 32. As shown in FIG. 2, the first valve 54 is in line with the fifth hydraulic line 50, and when open, permits hydraulic fluid to flow from the hydraulic fluid tank assembly 20 through the fifth hydraulic line 50. The second valve 56 is in line with the sixth hydraulic line 52, and when open, permits hydraulic fluid to flow from the hydraulic fluid tank assembly 20 through the sixth hydraulic line 52.

In some embodiments, the first valve 54 and the second valve 56 are substantially similar to each other. In some embodiments, each of the first valve 54 and the second valve 56 are flow control valves. The first valve 54 and the second valve 56 may be electro-mechanical valves that are semi-active valves with a combination of passive spring-disk elements and a solenoid. An electrical current may be supplied to the solenoids of the first valve 54 and/or the second valve 56 to open the first valve 54 and/or the second valve 56 to change the damping characteristics of the damper 16. Although the first valve 54 and the second valve 56 are described as solenoid operated, they may be operated by other electrical structures or using energy other than electrical energy. In some embodiments, the first valve 54 and the second valve 56 may be configured as hydraulic passive valves or semi-active hydraulic valves. As such, the first valve 54 and the second valve 56 need not be in receipt of an electrical signal if configured as passive valves.

Having described the components of an exemplary embodiment of the damper 16, operation of the damper 16 is described. It should be appreciated that because the pump 34 is a bi-directional pump, the pump port that acts as an intake on the pump 34 and the pump port and that acts as an outlet on the pump 34 may be switched when the rotational direction of the pump motor 36 is reversed. For example, when the pump motor 36 is driving in a first direction and the first valve 54 is open, fluid is drawn from the hydraulic fluid tank assembly 20 through the fifth hydraulic line 50 and the third hydraulic line 46 to the first pump port 38. The first pump port 38 acts as a pump intake during this portion of operation. Pressurized fluid exits the second pump port 40 acting as a pump outlet. In a different operational mode, when the pump motor 36 is driving in a second direction (opposite the first direction) and the second valve 56 is open, fluid is drawn from the hydraulic fluid tank assembly 20 through the sixth hydraulic line 52 and the fourth hydraulic line 48 to the second pump port 40. The second pump port 40 acts as a pump intake during this portion of operation. Pressurized fluid exits the first pump port 38 acting as a pump outlet.

As an additional example, when the pump motor 36 is driving in a first direction and the first valve 54 and the second valve 56 are closed, fluid is drawn from the first working chamber 30 through the first hydraulic line 42 and the third hydraulic line 46 to the first pump port 38. The first pump port 38 acts as a pump intake during this portion of operation. Pressurized fluid exits the second pump port 40 acting as a pump outlet and is directed to the second working chamber 32 through the fourth hydraulic line 48 and the second hydraulic line 44. In a different operational mode, when the pump motor 36 is driving in a second direction (opposite the first direction) and the first valve 54 and the second valve 56 are closed, fluid is drawn from the second working chamber 32 through the second hydraulic line 44 and the fourth hydraulic line 48 to the second pump port 40. The second pump port 40 acts as a pump intake during this portion of operation. Pressurized fluid exits the first pump port 38 acting as a pump outlet and is directed to the first working chamber 30 through the third hydraulic line 46 and the first hydraulic line 42.

It will be understood that the components and fluid connections shown in FIG. 2 are merely exemplary and that additional or alternative components and/or fluid connections may be used without departing from the scope of the disclosure.

Figure 3:
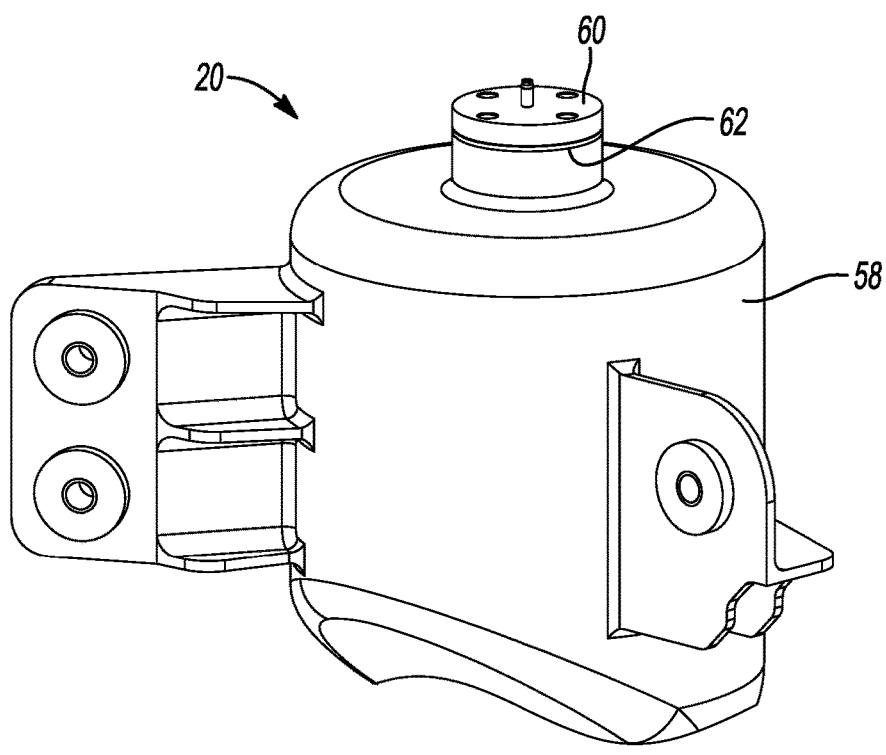
FIG. 3 is a perspective view of a portion of an exemplary hydraulic fluid tank assembly having a hydraulic fluid tank and a breather cap assembly in accordance with the teachings of the present disclosure.
Figure 4:
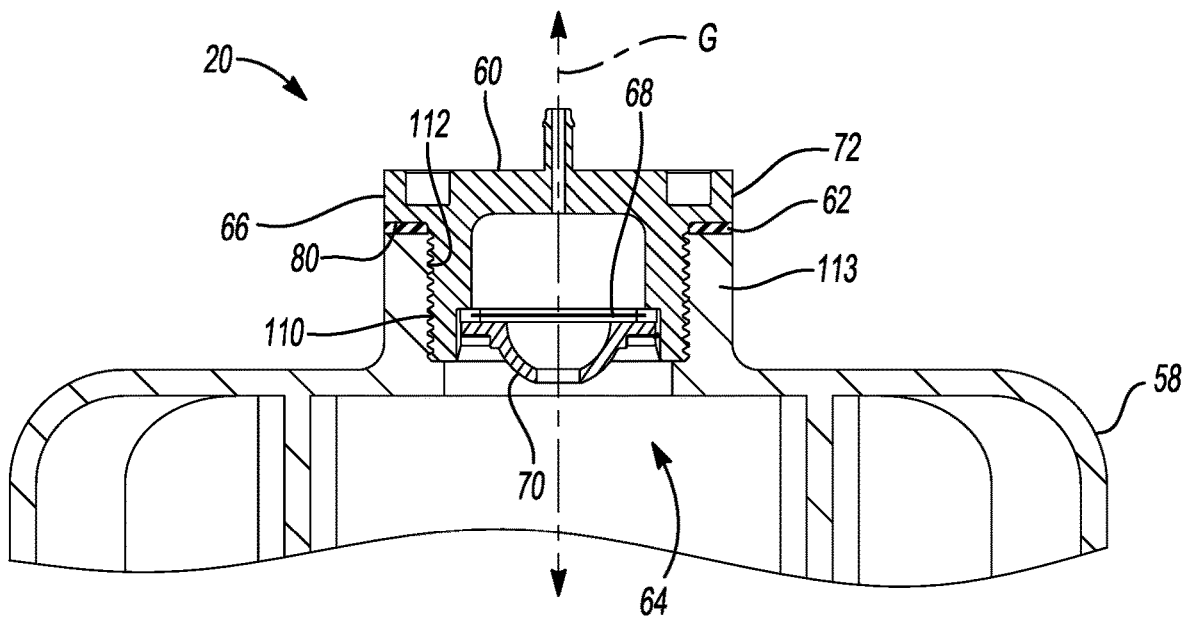
FIG. 4 is a section view of the hydraulic fluid tank assembly illustrated in FIG. 3.

With reference to FIGS. 3 and 4, an example of the hydraulic fluid tank assembly 20 is illustrated. The hydraulic fluid tank assembly 20 includes a hydraulic fluid tank 58, a breather cap assembly 60, and a gasket 62. The hydraulic fluid tank 58 has an interior chamber 64 configured to contain a volume of hydraulic fluid and a volume of gas (e.g., air). The breather cap assembly 60 is releasably coupled to the hydraulic fluid tank 58 and may be removed from and replaced onto the hydraulic fluid tank 58 to enable maintenance of the breather cap assembly 60, such as for example replacement of one or more components of the breather cap assembly 60. In some embodiments, the breather cap assembly 60 may be removed to enable filling of the hydraulic fluid tank 58 with hydraulic fluid. The gasket 62 located between the hydraulic fluid tank 58 and the breather cap assembly 60 to prevent leaking of hydraulic fluid and/or gas out of the hydraulic fluid tank 58 between the interface of the hydraulic fluid tank 58 and the breather cap assembly 60.

Breather Cap Assembly

With reference to FIGS. 5, 6, 7, 10, 11, and 12, an embodiment of the exemplary breather cap assembly 60 is shown. The breather cap assembly 60 includes a breather cap 66, a filter 68, and a splash guard 70. The filter 68 is sandwiched between the breather cap 66 and the splash guard 70.

Breather Cap

With additional reference to FIGS. 5, 6, 7, and 8, the breather cap 66 includes a base 72, a skirt 74 extending from the base 72, and a passageway 76 extending through the base 72. The base 72 has a first side 78, a second side 80 opposite the first side 78, and a thickness 82 between the first side 78 and the second side 80. In some embodiments, the base 72 is cylindrical and has a first outer diameter 84. Although the base 72 is shown as cylindrical, the base 72 may have other shapes without departing from the scope of the disclosure.

The skirt 74 extends a first distance 86 from the second side 80 of the base 72 and away from the first side 78 of the base 72. The skirt 74 terminates in a distal end 88. The exemplary skirt 74 is cylindrical and includes a first outer side 90 and a second inner side 92. The first outer side 90 of the skirt 74 has a second outer diameter 94, wherein the second outer diameter 94 of the skirt 74 is less than the first outer diameter 84 of the base 72. The second side 80 of the base 72 forms a first shoulder 96. The gasket 62 is sized to fit over the second outer diameter 94 of the skirt 74 and is configured to be sandwiched between the first shoulder 96 of the base 72 and the hydraulic fluid tank 58 when the breather cap assembly 60 is secured to the hydraulic fluid tank 58.

At the distal end 88 of the skirt 74 is a distal opening 97 to an open chamber 98 formed by the skirt 74. The open chamber 98 may also be referred to as a recess or a pocket. Additionally, at the distal end 88 of the skirt 74 is an annular end surface 100 extending between the first outer side 90 and the second inner side 92. The breather cap 66 further includes a second shoulder 102 on the second inner side 92 of the skirt 74. The second shoulder 102 is located a second distance 104 from the second side 80 of the base 72, where the second distance 104 is less than the first distance 86. Thus, the second shoulder 102 is located between the second side 80 of the base 72 and the distal end 88 of the skirt 74. The second shoulder 102 is also located a third distance 106 inward from the distal end 88 of the skirt 74 toward the second surface 80 of the base 72. The third distance 106 may be equal to the difference between the first distance 86 and the second distance 104. The breather cap 66 further includes a nipple 108 extending from the first side 78 of the base 72 away from the second side 80 of the base 72. The passageway 76 extends through the nipple 108 and the base 72. The nipple 108 is configured to be fluidly coupled with a breather hose (not shown), wherein the breather hose terminates in an opening that is above the maximum water wading depth of the vehicle 10. This reduces or prevents the possibility of water entering the hydraulic fluid tank 58 if the vehicle 10 enters water.

Figure 5:
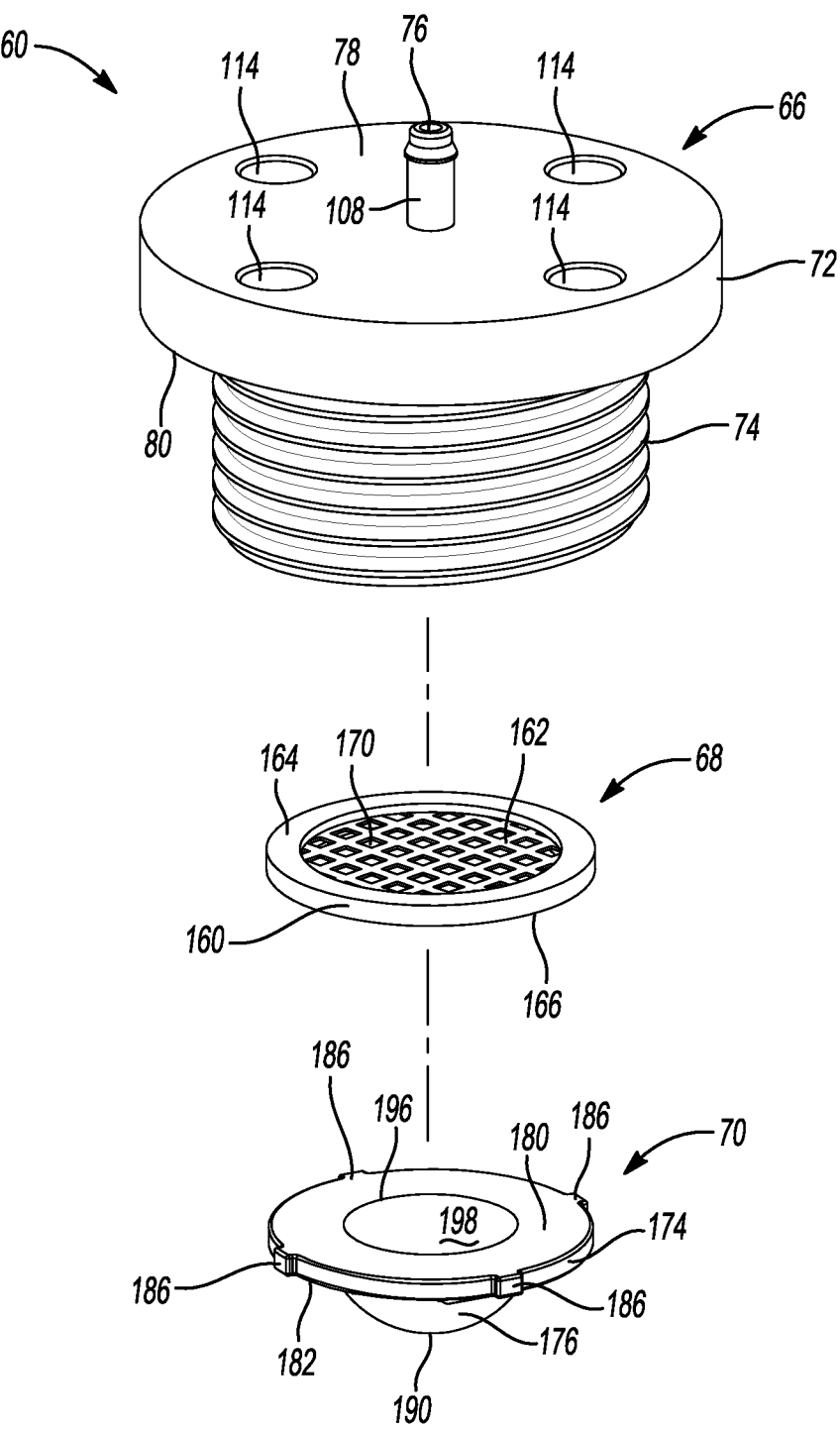
FIG. 5 is an exploded top perspective view of an exemplary breather cap assembly having a breather cap, a filter, and a splash guard in accordance with the teachings of the present disclosure.
Figure 7:
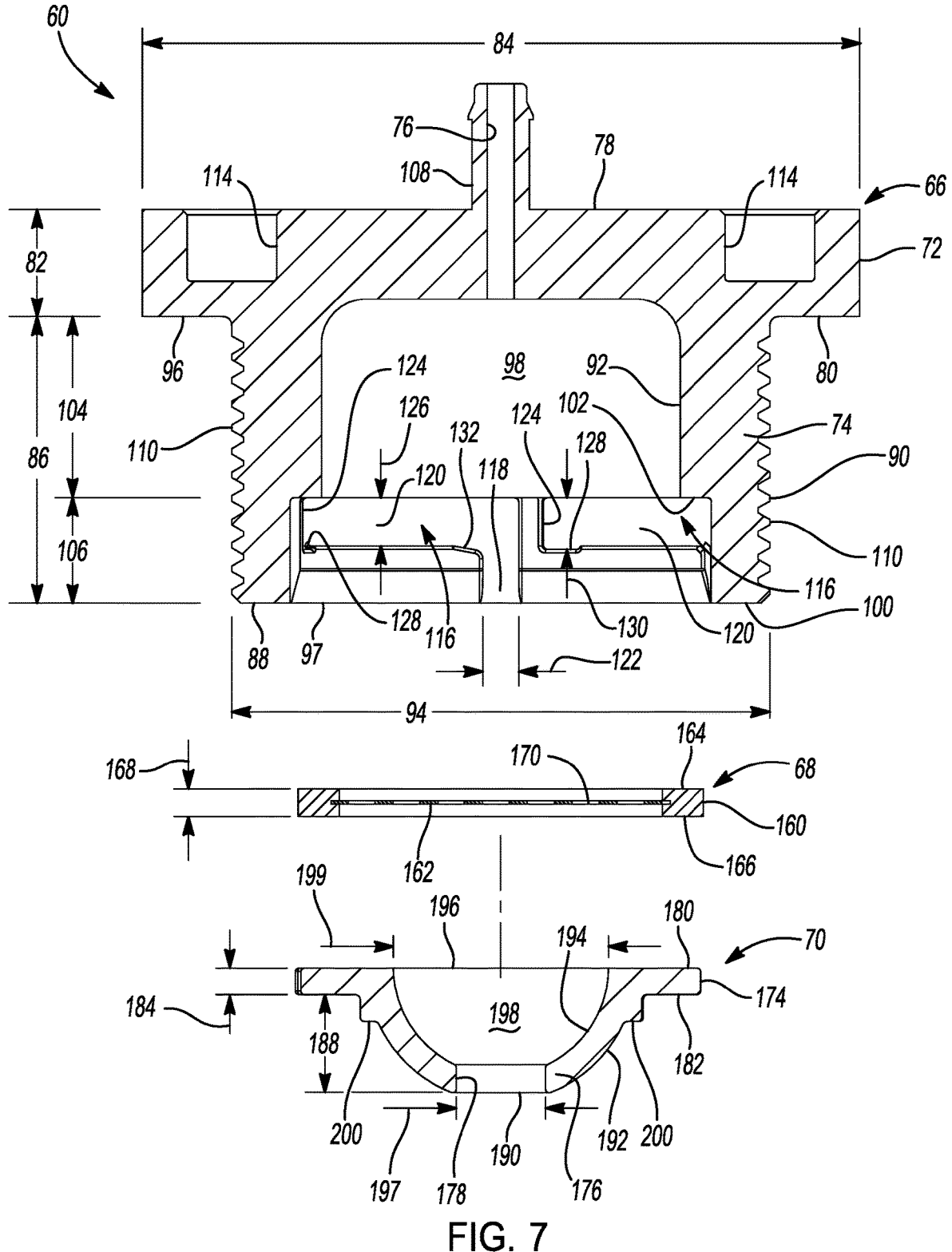
FIG. 7 is an exploded cross-sectional view of the exemplary breather cap assembly shown in FIG. 5.

The breather cap 66 includes one or more fastening features configured to releasably couple the breather cap 66 to the hydraulic fluid tank 58. For example, the first outer side 90 of the skirt 74 includes threads 110 configured to cooperate with threads 112 on an inner side of a neck 113 of the hydraulic fluid tank 58 (see FIG. 4) to releasably couple the breather cap 66 to the hydraulic fluid tank 58. In some embodiments, the breather cap 66 also includes one or more torquing features on the base 72 of the breather cap 66 configured to be engaged with a tool to tighten or engage or loosen/disengage the breather cap 66 on the hydraulic fluid tank 58. For example, as shown in FIGS. 5 and 7, the torquing features include four blind holes 114 extending from the first side 78 of the base 72 toward the second side 80 of the base 72. Although four holes 114 are shown, it should be understood that greater or fewer than four holes 114 may be included without departing from the scope of the disclosure. The four holes 114 are configured to be engaged with a special tool that is not readily available to end users, such as owners of the vehicle 10, but may be available to vehicle assemblers, dealers, and/or mechanics.

Figures 8, 9:
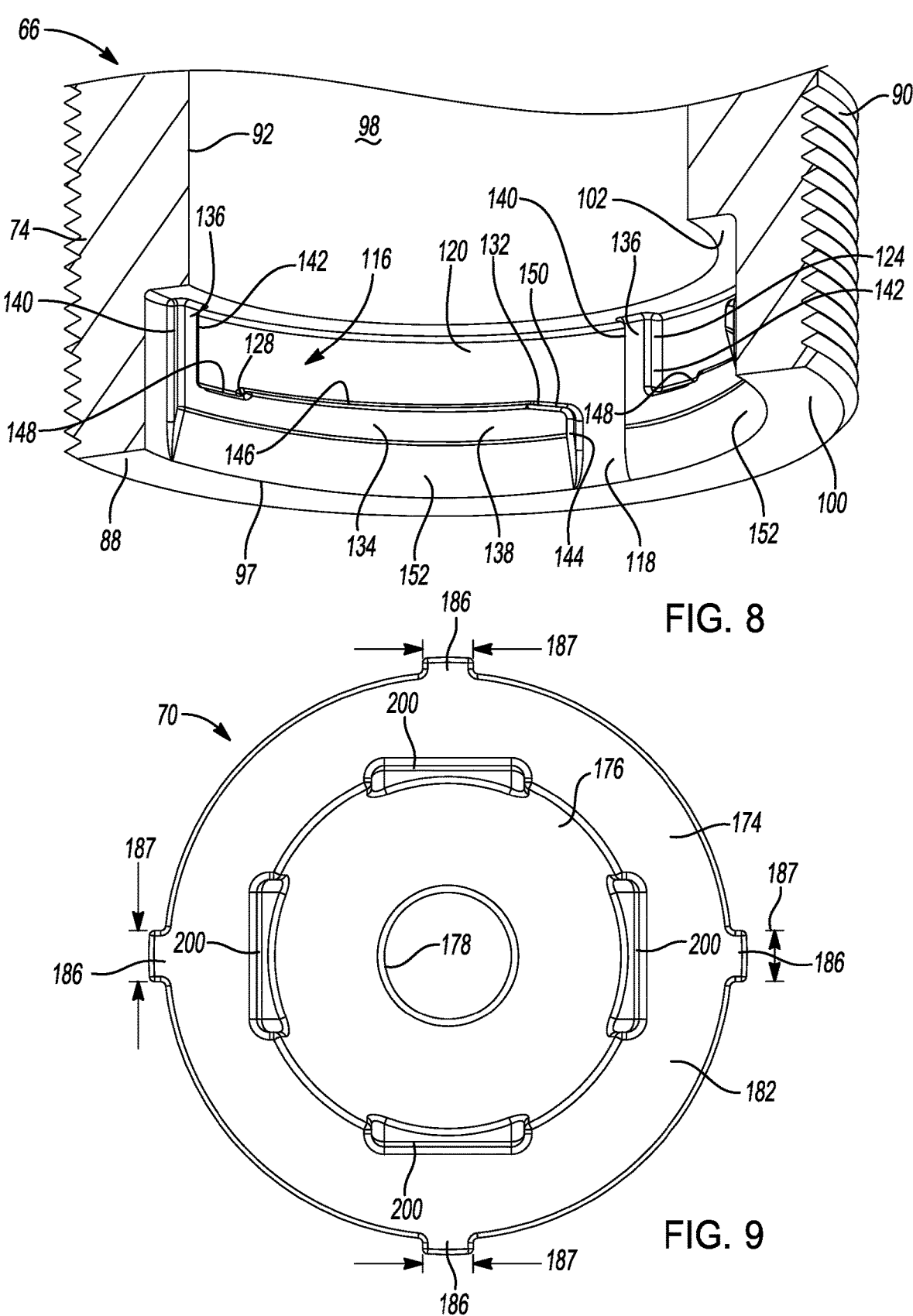
FIG. 8 is a perspective section view of the exemplary breather cap shown in FIG. 5.
FIG. 9 is a bottom view of the exemplary splash guard shown in FIG. 5.
Figures 10, 11:
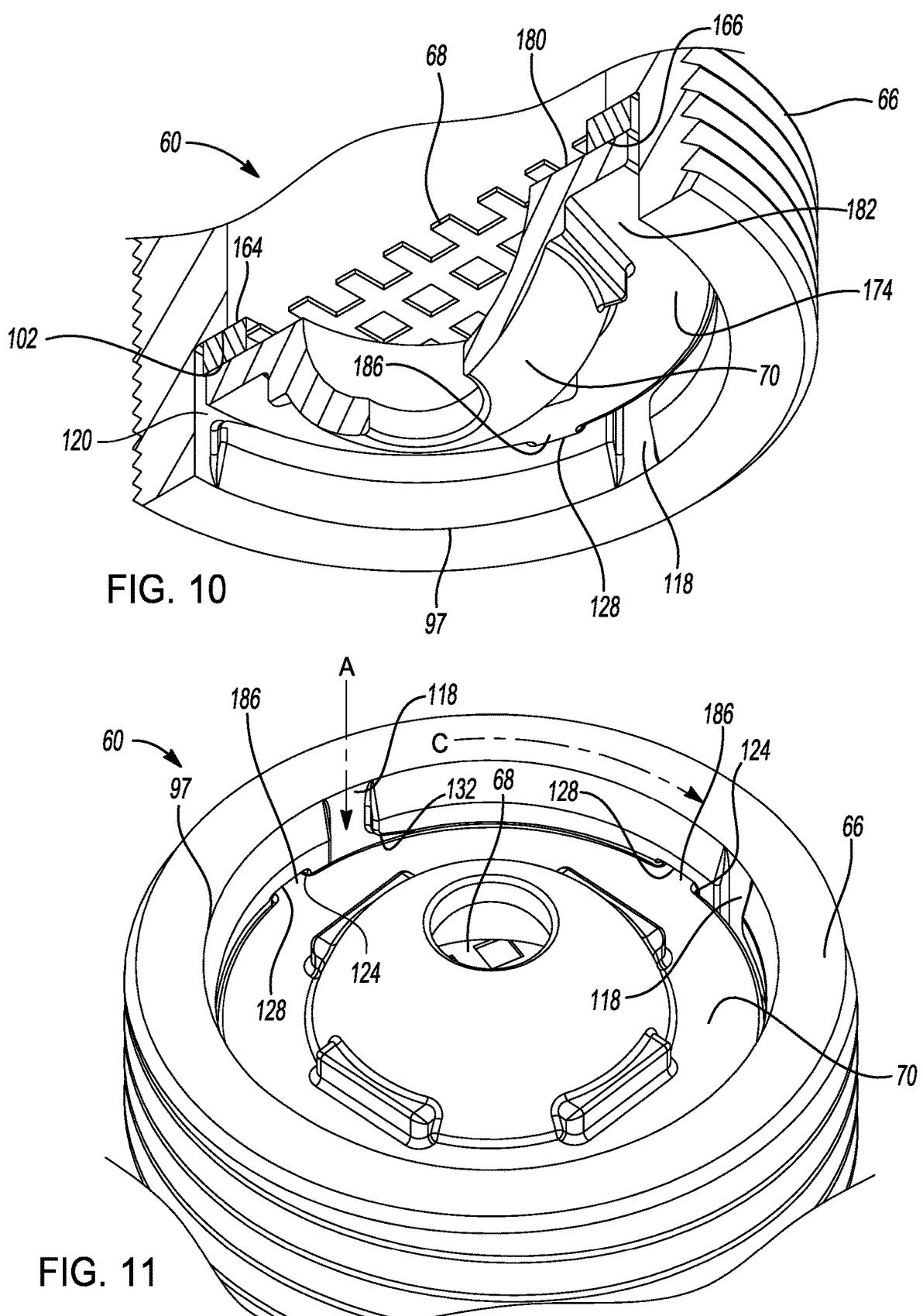
FIG. 10 is a perspective section view of the exemplary breather cap assembly shown in FIG. 5.
FIG. 11 is a bottom perspective section view of the exemplary breather cap assembly shown in FIG. 5.

With reference to FIGS. 7 and 8, the exemplary breather cap 66 includes a plurality of mounting grooves 116 located on the second inner side 92 of the skirt 74. For example, the breather cap 66 includes four mounting grooves 116. In some embodiments, each mounting groove 116 includes an axial groove 118 and a circumferential groove 120, which are connected and cooperate to form an L-shaped mounting groove 116. For example, the axial groove 118 is on the second inner side 92 of the skirt 74 and extends from the distal end 88 of the skirt 74 toward the second side 80 of the base 72. The axial groove 118 terminates at or proximate to the second shoulder 102. The axial groove 118 has a first width 122. The circumferential groove 120 extends at least partially circumferentially along the second inner side 92 of the skirt 74 from the axial groove 118 and terminates in a groove stop 124. The circumferential groove 120 has a second width 126.

In some embodiments, one, some, or all of the mounting grooves 116 include an optional detent 128 that extends axially away from the second shoulder 102 proximate to or at the groove stop 124. The detent 128 has a third width 130 that is slightly greater than the second width 126 of the circumferential groove 120. In some embodiments, the circumferential groove 120 includes a lead in ramp 132 proximate to the connection of the axial groove 118 and the circumferential groove 120. The circumferential groove 120 extends along the second shoulder 102 and is bounded by the second shoulder 102 on one side.

Figure 6:
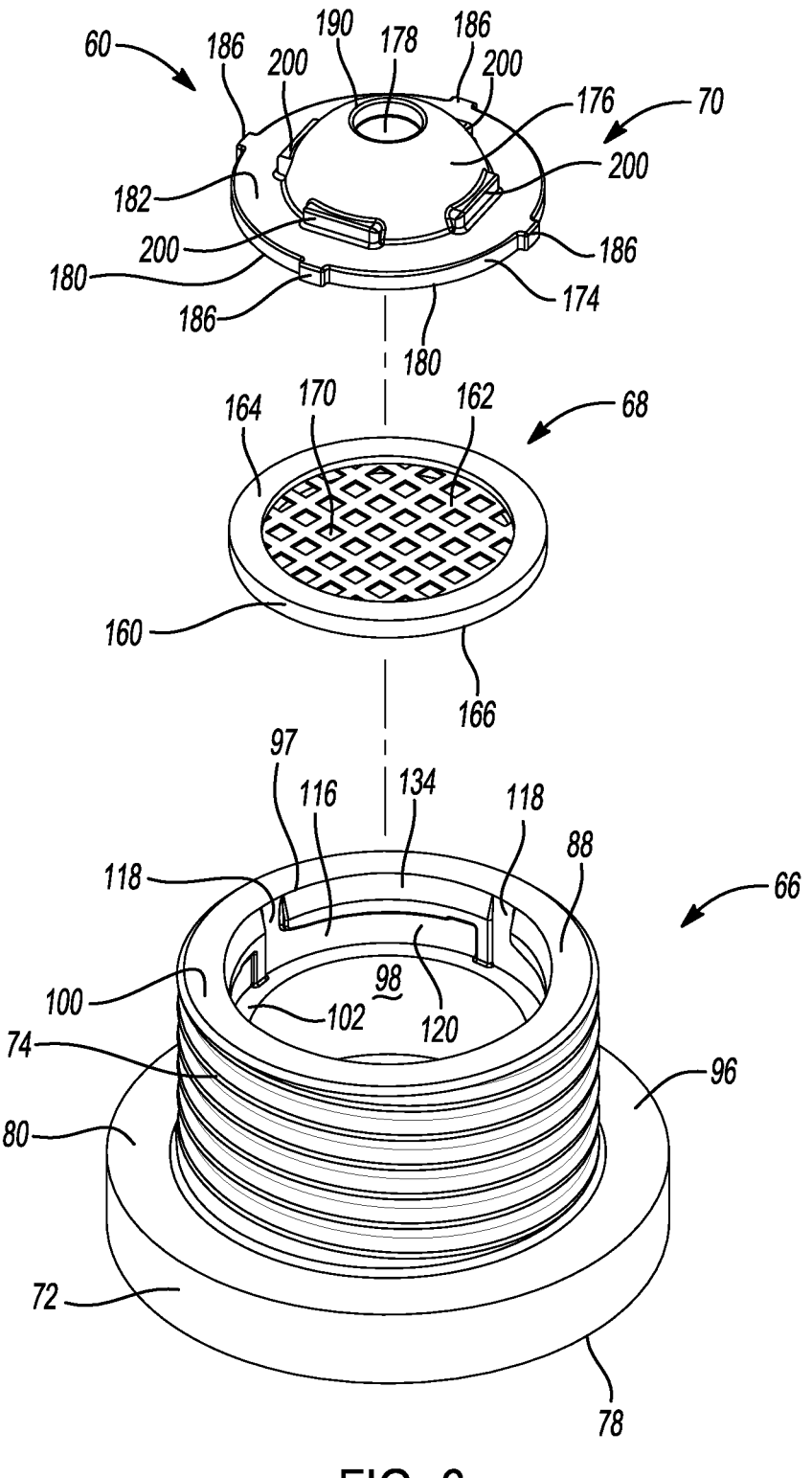
FIG. 6 is an exploded bottom perspective view of the exemplary breather cap assembly shown in FIG. 5.

Stated another way, and as shown in FIGS. 6 and 8, each mounting groove 116 is formed by the second shoulder 102 of the skirt 74 and an L-shaped rib 134 on the second inner side 92 of the skirt 74. The L-shaped rib 134 includes an axial rib 136 and a circumferential rib 138 connected thereto. The axial rib 136 extends from the second shoulder 102 toward the distal end 88 of the skirt 74. The axial rib 136 has a first axial wall 140 and a second axial wall 142. The circumferential rib 138 extends at least partially circumferentially along the second inner side 92 of the skirt 74 from the axial rib 136 away from the first axial wall 140 of the axial rib 136 and terminates in a third axial wall 144. The circumferential rib 138 has a circumferential wall 146 located between the second shoulder 102 and the distal end 88 of the skirt 74. In some embodiments, the circumferential rib 138 has a recessed portion 148 proximate to or at the intersection of the axial rib 136 and the circumferential rib 138, the recessed portion 148 located circumferentially between the second axial wall 142 and the circumferential wall 146. The circumferential rib 138 may include a chamfer 150 proximate to the between the circumferential wall 146 and the third axial wall 144, proximate to the third axial wall 144. Opposite the circumferential wall 146, the circumferential rib 138 may have a taper 152 or may taper toward the distal end 88 of the skirt 74.

The circumferential wall 146 of the circumferential rib 138 and the second shoulder 102 cooperate to form the circumferential groove 120. The first axial wall 140 of the axial rib 136 and the third axial wall 144 of an adjacent circumferential rib 138 cooperate to form the axial groove 118. The second axial wall 142 of the axial rib 136 forms the groove stop 124 of the circumferential groove 120. The recessed portion 148 of the circumferential rib 138 forms the detent 128 of the mounting groove 116. The distance between the circumferential wall 146 and the second shoulder 102 forms the second width 126 of the circumferential groove 120 and the distance between the recessed portion 148 and the second shoulder 102 forms the third width 130 of the detent 128. The chamfer 150 in the circumferential rib 138 forms the lead in ramp 132 of the mounting groove 116.

Filter

With continued reference to FIGS. 5, 6, and 7, an exemplary filter 68 is illustrated. The filter 68 includes a filter element 162 and a filter edge finishing 160 coupled to the filter element 162. The filter element 162 may have one or more openings 170 through which gas (e.g., air) is able to pass, and into and out of the chamber 64 of the hydraulic fluid tank 58, while filtering out contaminants. Thus, the filter 68 is configured to prevent contaminants from entering hydraulic fluid tank 58 that could compromise or reduce the performance of the hydraulic fluid and the suspension system 12. In some embodiments, for example only and without limitation, the filter element 162 may be a filtration grade 40

μm 3-layer sintered wire mesh laminate, wherein the wire mesh is AISI 304/316, and has an air permeation capability of greater than 1.5 L/min.

The filter edge finishing 160 has a first side 164, a second side 166 opposite the first side 164, and a thickness 168 between the first side 164 and the second side 166. In some embodiments, the filter edge finishing 160 and the filter element 162 are circular in shape, with the filter edge finishing 160 having an annular or ring shape extending circumferentially around the filter element 162. Although the filter element 162 and filter edge finishing 160 are shown as circular, the filter element 162 and/or the filter edge finishing 160 may have other shapes without departing from the scope of the disclosure. In some embodiments, the filter edge finishing 160 is a metal ring that is folded and crimped around the edge of the filter element 162. In some embodiments, the filter edge finishing 160 may be a resilient or compressible material, such as for example, rubber, that may be molded onto the filter element 162. In some embodiments, the filter edge finishing 160 may be a gasket. The filter 68 is sized to be disposed in the chamber 98 of the skirt 74 on the second inner side 92 of the skirt 74 and is configured to rest against the second shoulder 102 of the skirt 74.

Splash Guard

With reference to FIGS. 5, 6, 7, and 9, an exemplary splash guard 70 is illustrated. The splash guard 70 includes a base 174 and a guard portion 176 extending from the base 174, and a distal opening 178 extending through the guard portion 176. The guard portion 176 is raised with respect to the base 174. The guard portion 176 is configured to extend toward the chamber 64 of the hydraulic fluid tank 58 (see FIG. 13). The base 174 has a first side 180, a second side 182 opposite the first side 180, and a thickness 184 between the first side 180 and the second side 182. In some embodiments, the base 174 is circular in shape and includes one or more tabs 186 extending radially outward from the base 174. The base 174 is sized to be disposed in the chamber 98 of the skirt 74 on the second inner side 92 of the skirt 74 and is configured to rest against the filter 68. The one or more tabs 186 are configured to be received in the one or more mounting grooves 116 in the breather cap 66 to releasably couple the splash guard 70 with the breather cap 66. For example, the tabs 186 may have a width 187, wherein the width is less than or equal to the first width 122 of the axial grooves 118 of the breather cap 66. The exemplary splash guard 70 includes four tabs 186, with each tab 186 spaced equally circumferentially around the base 174, such as for example, 90 degrees apart. However it will be understood that greater or fewer numbers of tabs 186 may be included without departing from the scope of the disclosure. Additionally, in some embodiments, the tabs 186 may not be spaced equally circumferentially around the base 174 without departing from the scope of the disclosure.

The guard portion 176 of the splash guard 70 extends a first distance 188 from the second side 182 of the base 174 and away from the first side 180 of the base 174. The guard portion 176 terminates in a distal end 190. The guard portion 176 is wider at the base 174 than at the distal end 190. The distal opening 178 is located at the distal end 190 of the guard portion 176. The guard portion 176 includes a first outer side 192 and a second inner side 194. Proximate to the first side 180 of the base 174 is a proximal opening 196 to an open chamber 198 formed by the second inner side 194 of the guard portion 176. The distal opening 178 has a diameter 197 less than the diameter 199 of the proximal opening 196.

As shown in FIGS. 5, 6, and 7, the guard portion 176 has a domed shape. In some embodiments, the guard portion 176 may have a hemispherical shape. However, it will be understood that in other embodiments, the guard portion 176 may have other shapes without departing from the scope of the disclosure, for example and without limitation, a conical shape, a frustoconical shape, a cylindrical shape, and an hourglass shape.

In some embodiments, the splash guard 70 further includes one or more features configured to be engaged with a tool to engage or disengage the splash guard 70 with the breather cap 66. As shown in FIGS. 6, 7, and 9, the splash guard 70 includes one or more lugs 200 extending from the second side 182 of the base 174. In some embodiments, the lugs 200 are integrally formed with the base 174 and the guard portion 176 of the splash guard 70. As shown in FIG. 9, the lugs 200 may form a discontinuous square shape around the guard portion 176. In some embodiments, the lugs 200 are configured to be engaged with a special tool that is not readily available to end users, such as owners of the vehicle 10, but may be available to vehicle assemblers, dealers, and/or mechanics. In some embodiments, the lugs 200 may be configured to be engaged with by a standard tool.

Assembly of the Breather Cap Assembly

Having described the individual components of the breather cap assembly 60, the assembly thereof is described. To assemble the breather cap assembly 60, the filter 68 is inserted into the skirt 74 of the breather cap 66 through the distal opening 97 and is pushed toward the second side 80 of the breather cap 66 until the filter edge finishing 160 contacts the second shoulder 102. The filter 68 is thus seated against the second shoulder 102 of the breather cap 66. Then the splash guard 70 is oriented with the first side 180 of the base 174 facing the second side 80 of the breather cap 66, such that the guard portion 176 is facing away from the second side 80 of the breather cap 66. The tabs 186 of the splash guard 70 are then oriented to align with the axial grooves 118 of the breather cap 66. The tabs 186 of the splash guard 70 are then inserted into the axial grooves 118 of the breather cap 66, with one tab 186 per axial groove 118. The splash guard 70 is then pushed toward the second side of the filter 68 (along arrow A in FIG. 11) until the first side 180 of the splash guard 70 contacts the filter edge finishing 160. The splash guard 70 is then rotated (along arrow C in FIG. 11) such that the tabs 186 of the splash guard 70 move along and within the circumferential grooves 120 of the breather cap 66. The lead in ramp 132 assists with the transition of the movement of the tabs 186 of the splash guard 70 from axial movement (along arrow A) in the axial grooves 118 to circumferential movement (along arrow C) in the circumferential grooves 120. The splash guard 70 is rotated until the tabs 186 contact the groove stops 124 of the circumferential grooves 120, which are configured to prevent further rotation of the splash guard 70. In some embodiments, the filter edge finishing 160 is compressed against the second shoulder 102 by the splash guard 70 and a sealing contact may be formed between the filter edge finishing 160, the second shoulder 102 and the splash guard 70. The splash guard 70 retains the filter 68 in the open chamber or recess 98 of the breather cap 66. In the event that disassembly of the breather cap assembly 60 is desired or required, for example to service, clean, and/or replace one or more of the breather cap 66, filter 68, and splash guard 70, the breather cap assembly 60 may be disassembled by rotating the splash guard 70 in the opposite direction of arrow C, removing the splash guard 70 from breather cap 66 along the opposite direction of arrow A. The filter 68 may then be removed from the breather cap 66. For example, when the filter 68 has reached the end of its service life, it may be removed and replaced with a new filter 68.

As described above, in some embodiments, the breather cap 66 may optionally include detents 128 into which the tabs 186 of the splash guard 70 are configured to interface with. In some embodiments, the combined thickness of the filter edge finishing 160 and the base 174 of the splash guard 70 (i.e., the sum of thickness 168 of the filter edge finishing 160 and the thickness 184 of the splash guard 70) may be slightly greater than the third width 130. During assembly of the splash guard 70 into the breather cap 66, the filter edge finishing 160 may be slightly compressed. When the tabs 186 of the splash guard 70 reach and enter into the detent 128, the filter edge finishing 160 is able to expand pressing the tabs 186 of the splash guard 70 into the detents 128, assisting in retaining the tabs 186 in the detents 128 and the splash guard 70 in the breather cap 66. At that point, the filter 68 is sandwiched between the breather cap 66 and the splash guard 70, with the first side 164 of the filter edge finishing 160 contacting the second shoulder 102 of the skirt 74 and the second side 166 of the filter edge finishing 160 contacting the first side 180 of the base 174 of the splash guard 70, this contact forms a seal between the breather cap 66, the filter edge finishing 160, and the splash guard 70.

As shown in FIG. 4, the breather cap assembly 60 is releasably coupled to the hydraulic fluid tank 58 by the threads 110 of the breather cap 66 and the threads 112 of the neck 113 of the hydraulic fluid tank 58. When the breather cap 60 is coupled to the hydraulic fluid tank 58, the gasket 62 is sandwiched between the second side 80 of the base 72 of the breather cap 66 and the neck 113 of the hydraulic fluid tank 58 to form a seal between the breather cap assembly 60 and the hydraulic fluid tank 58.

Figures 12, 13:
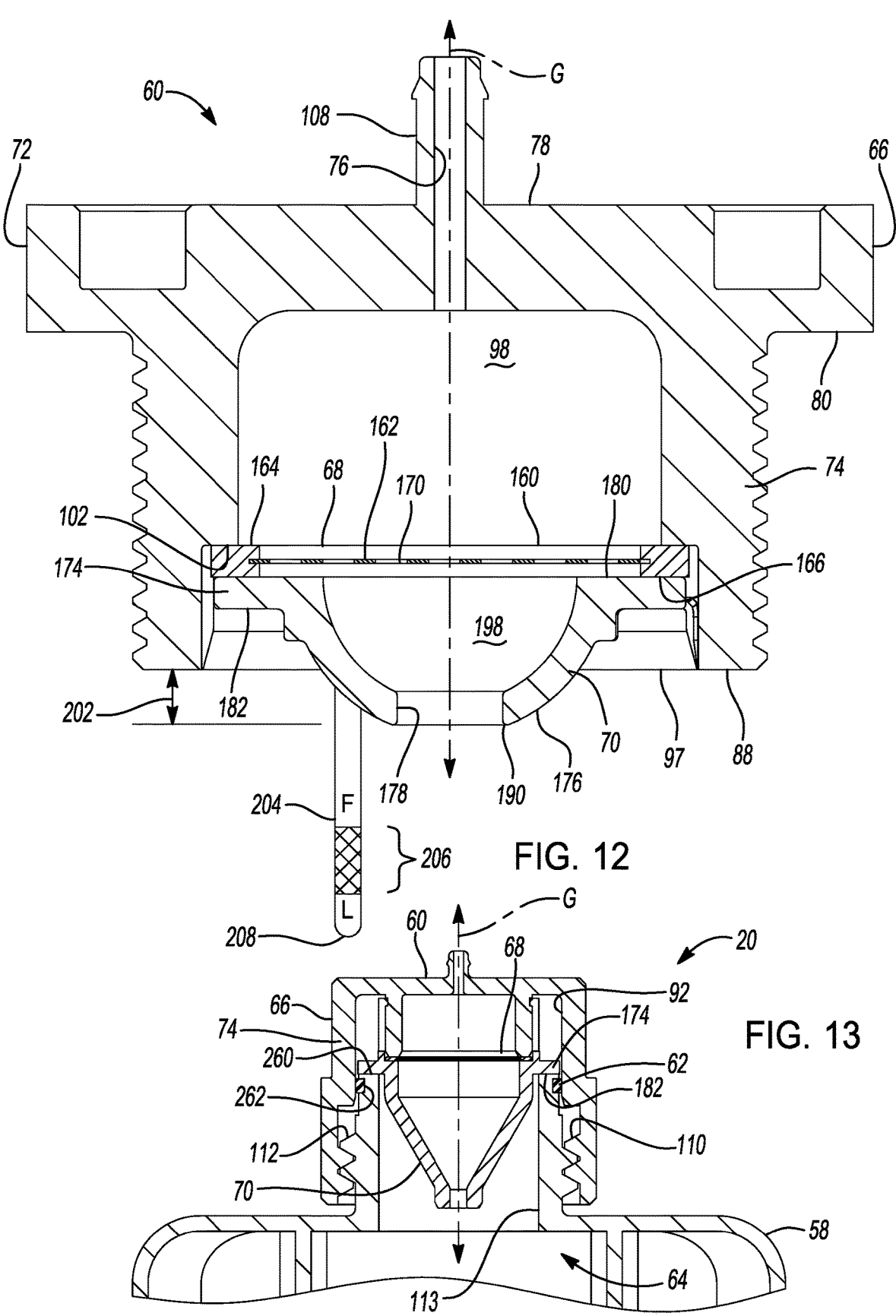
FIG. 12 is a cross-sectional view of the exemplary breather cap assembly shown in FIG. 5 having an exemplary optional dipstick.
FIG. 13 is a section view of another exemplary hydraulic fluid tank assembly having a hydraulic fluid tank and a breather cap assembly in accordance with the teachings of the present disclosure.

In some embodiments, at least a portion of the splash guard 70 extends beyond the breather cap 66 toward the chamber 64 of the hydraulic fluid tank 58. For example, as shown in FIG. 12, when the splash guard 70 is installed in the breather cap 66, in some embodiments, the distal end 190 of splash guard 70 extends a distance 202 beyond distal end 88 of breather cap 66. However, it should be understood that in some embodiments, the distal end 190 of splash guard 70 does not extend beyond the distal end 88 of breather cap 66. In some embodiments, the distance 202 is zero. In some embodiments, the distal end 88 of breather cap 66 extends a distance beyond the distal end 190 of splash guard 70.

As shown in FIGS. 4 and 12, the breather cap 66, filter 68, and filter edge finishing 160 cooperate to form a breather cap assembly 60 through which gas (e.g., air) is able to pass, and into and out of the chamber 64 of the hydraulic fluid tank 58 as shown by bi-directional arrow G. For example, gas (e.g., air) may pass through the breather cap assembly 60 via passageway 76 and open chamber 98 of the breather cap 66, openings 170 in the filter 68, and open chamber 198 and distal opening 178 of splash guard 70.

Alternative Embodiment of Breather Cap Assembly with Dipstick

Now with continued reference to FIG. 12, the breather cap assembly 60 is shown in which the splash guard 70 includes an optional dipstick 204. The dipstick 204 is coupled to the splash guard 70 and extends away from the base 174 of the splash guard 70. For example, the dipstick 204 is coupled to the guard portion 176 of the splash guard 70. The dipstick 204 includes markings 206 proximate to a distal end 208 of the dipstick 204 that are configured to assist in determining the level of hydraulic fluid contained in the hydraulic fluid tank 58. In some embodiments, the dipstick 204 is integrally formed with the splash guard 70.

Alternative Embodiment of the Breather Cap Assembly

Now with reference to FIGS. 13-18, an alternative embodiment of the breather cap assembly 60 is shown. The breather cap assembly 60 includes a breather cap 66, a filter 68, and a splash guard 70. The filter 68 is sandwiched between the breather cap 66 and the splash guard 70.

Alternative Embodiment of the Breather Cap

The breather cap 66 includes a base 72, a first skirt 74 extending from the base 72, and a passageway 76 extending through the base 72. The base 72 has a first side 78, a second side 80 opposite the first side 78, and a thickness 82 between the first side 78 and the second side 80. In some embodiments, the base 72 is cylindrical. Although the base 72 is shown as cylindrical, the base 72 may have other shapes without departing from the scope of the disclosure.

The first skirt 74 extends a first distance 86 from the second side 80 of the base 72 and away from the first side 78 of the base 72. The first skirt 74 terminates in a distal end 88. The exemplary first skirt 74 is cylindrical and includes a first outer side 90 and a second inner side 92.

At the distal end 88 of the first skirt 74 is a distal opening 97 to an open chamber 98 formed by the first skirt 74. Additionally, at the distal end 88 of the first skirt 74 is an annular end surface 100 extending between the first outer side 90 and the second inner side 92.

The breather cap 66 further includes a second skirt 210 within the open chamber 98 formed by the first skirt 74 and extending from the base 72 a second distance 212 from the second side 80 of the base 72 and away from the first side 78 of the base 72. The first skirt 74 may be referred to as an outer skirt and the second skirt 210 may be referred to as an inner skirt. The second skirt 210 terminates in a distal end 214. The exemplary second skirt 210 is cylindrical and includes a first outer side 216 and a second inner side 218. The second skirt 210 is concentric with the first skirt 74. At the distal end 214 of the second skirt 210 is a distal opening 220 to an open chamber 222 formed by the second skirt 210. Additionally, at the distal end 214 of the second skirt 210 is an annular end surface 224 extending between the first outer side 216 and the second inner side 218 of the second skirt 210. In some embodiments, a circumferential chamfer 225 is located on the second skirt 210 between the first outer side 216 and the annular end surface 224. The second distance 212 is less than the first distance 86. Thus, in some embodiments, the first skirt 74 extends further from the base 72 than the second skirt 210. Stated another way, the second skirt 210 is shorter than the first skirt 74.

The first outer side 216 of the second skirt 210 faces the second inner side 92 of the first skirt 74. The second skirt 210 includes a groove 226 extending at least partially circumferentially around the first outer side 216 of the second skirt 210 proximate to the second side 80 of the base 72 of the breather cap 66. In some embodiments, the groove 226 extends entirely around the circumference of the second skirt 210. In some embodiments, the groove 226 extends only partially around the circumference of the second skirt 210. In some embodiments, the groove 226 is discontinuous in its extension around circumference of the second skirt. In such embodiments, the groove 226 may be said to include a plurality of discontinuous grooves 226 extending at least partially around the circumference of the second skirt 210.

The breather cap 66 includes threads 110 configured to cooperate with the threads 112 on the hydraulic fluid tank 58. The threads 110 are located on the second inner side 92 of the first skirt 74. As shown in FIG. 13, the threads 112 are located on an outer side of the neck 113 of the hydraulic fluid tank 58.

The breather cap 66 also includes one or more one or more torquing features on the breather cap 66 configured to be engaged with a tool to tighten or engage or loosen/disengage the breather cap 66 with the hydraulic fluid tank 58. For example, as shown in FIGS. 14, 15, 16, and 18, the torquing features include four flat portions 228 formed on the first skirt 74 proximate to the first side 78 of the base 72. Although four flat portions 228 are shown, it should be understood that greater or fewer than four flat portions 228 may be included without departing from the scope of the disclosure. In some embodiments, the four flat portions 228 are configured to be engaged with a special tool that is not readily available to end users, such as owners of the vehicle 10, but may be available to vehicle assemblers, dealers, and/or mechanics. In other embodiments, the four flat portions 228 may be configured to be engaged with a generally-available wrench.

Alternative Embodiment of the Splash Guard

With continued reference to FIGS. 13-17, another exemplary splash guard 70 is illustrated. The splash guard 70 includes a base 174, a guard portion 176 extending from the base 174, and a distal opening 178 extending through the guard portion 176. The guard portion 176 is raised with respect to the base 174. The guard portion 176 is configured to extend toward the chamber 64 of the hydraulic fluid tank 58 (see FIG. 4). The base 174 has a first side 180, a second side 182 opposite the first side 180, and a thickness 184 between the first side 180 and the second side 182. In some embodiments, the base 174 is circular in shape. The embodiment of the splash guard 70 shown in FIGS. 13-17 includes one or more fingers 240 extending from the first side 180 of the base 174 away from the guard portion 176. The fingers 240 terminate in a distal end 242. The fingers 240 are curved and cooperate to form a cylindrical skirt shape. At the distal end 242 of each finger 240 is a protrusion 244 that extends radially inward from the finger 240. The protrusions 244 are configured to be received in the groove 226 of the breather cap 66 to retain the splash guard 70 on the breather cap 66.

The fingers 240 are configured to bent outward slightly during assembly of the splash guard 70 with the breather cap 66 and are then configured to return to their un-bent state when the protrusions 244 are received in the groove 226 of the breather cap 66. The protrusions 244 are configured to slide up the circumferential chamfer 225 on the second skirt 210 of the breather cap 66, to aid in assembly of the splash guard 70 on the breather cap 66.

Figure 14:
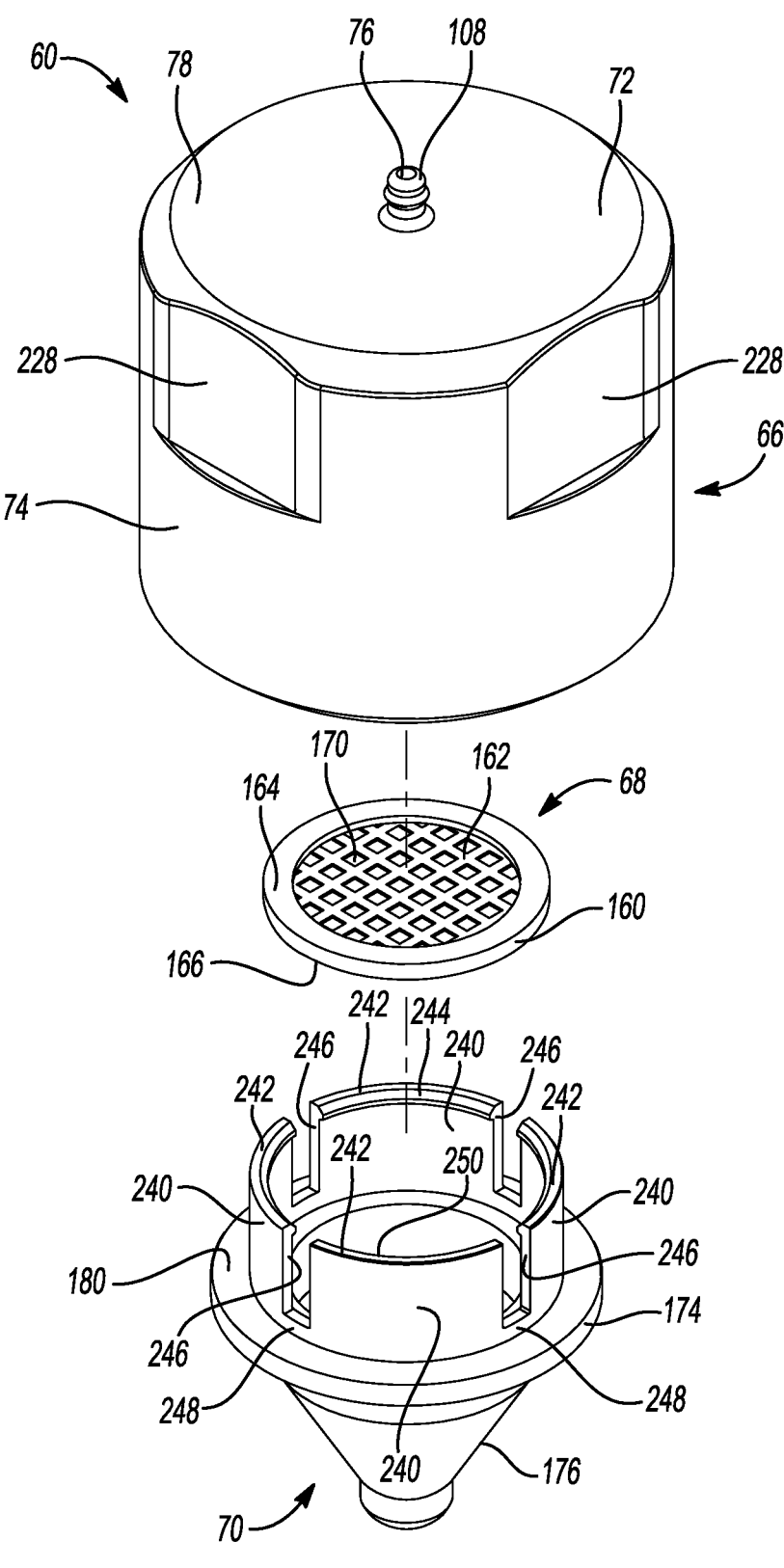
FIG. 14 is an exploded top perspective view of the exemplary breather cap assembly shown in FIG. 13 having a breather cap, a filter, and a splash guard in accordance with the teachings of the present disclosure.
Figure 15:
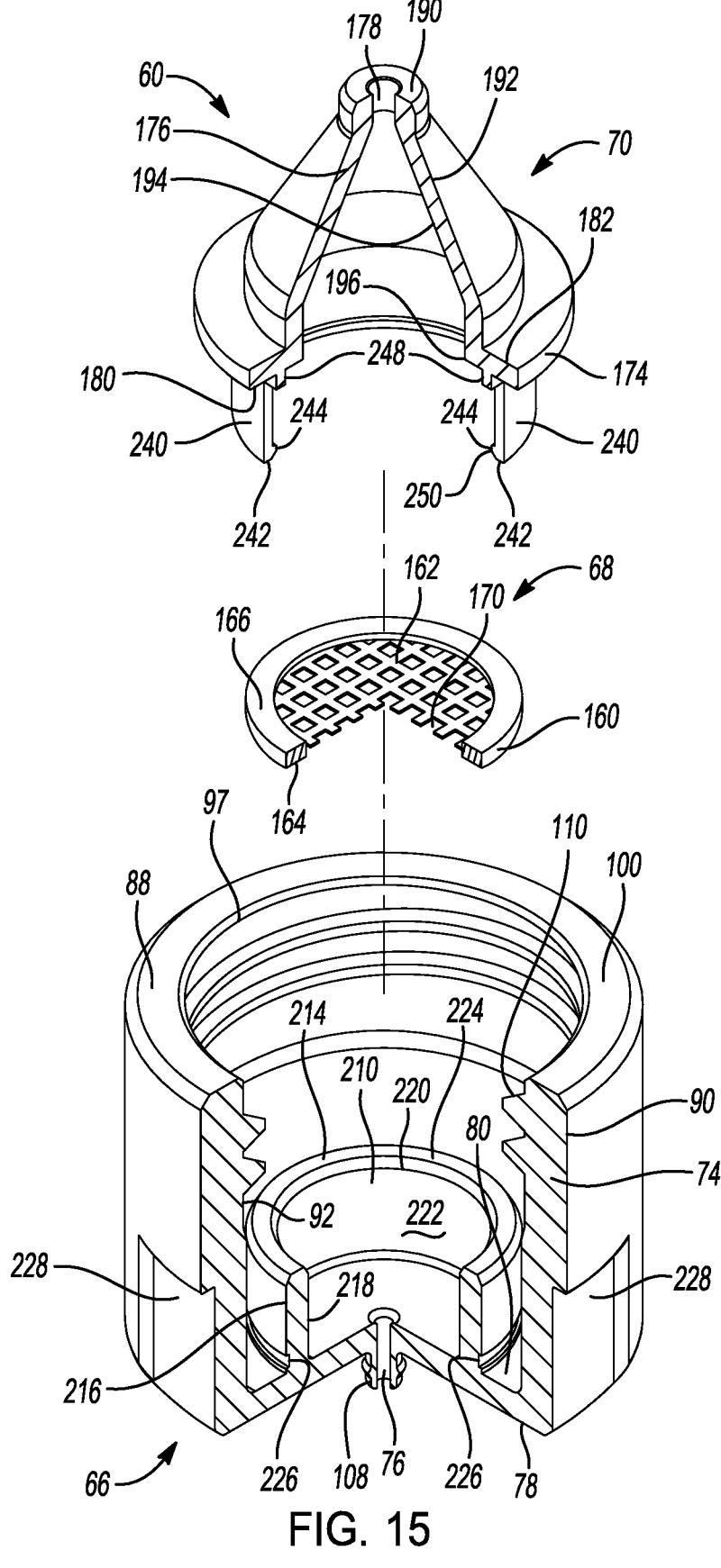
FIG. 15 is an exploded bottom perspective partial section view of the exemplary breather cap assembly shown in FIG. 14.
Figure 16:
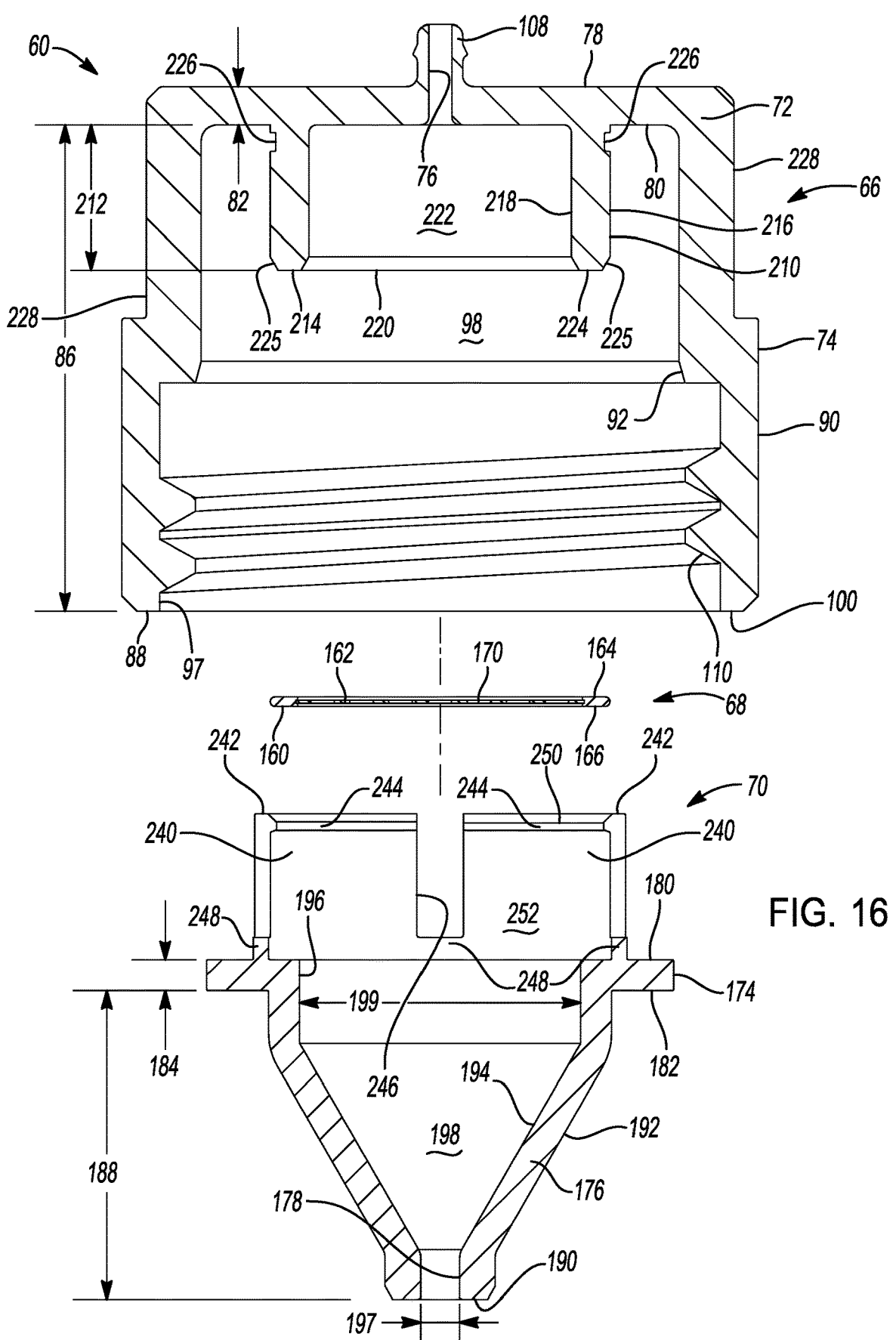
FIG. 16 is an exploded cross-sectional view of the exemplary breather cap assembly shown in FIG. 14.

The fingers 240 are at least partially separated by slots 246 that extend from the distal end 242 of the fingers toward the first side 180 of the base 174. As shown in FIGS. 14, 15, and 16, the splash guard 70 includes a web 248 between each pair of fingers 240. In some embodiments, the slots 246 extend all the way to the first side 180 of the base 174 and therefore lack the webs 248. Although four fingers 240 are shown, it should be understood that greater or fewer than four fingers 240 may be included without departing from the scope of the disclosure. At the distal end 242 of the fingers 240 is a distal opening 250 to an open chamber 252 formed by the fingers 240. The fingers 240 are located on the splash guard 70 to permit the second skirt 210 of the breather cap 66 to be received in the open chamber 252 formed by the fingers 240. The fingers 240 of the splash guard 70 are configured to be received in the annular space between the first skirt 74 and the second skirt 210 of the breather cap 66.

The guard portion 176 of the splash guard 70 extends the first distance 188 from the second side 182 of the base 174 and away from the first side 180 of the base 174. The guard portion 176 terminates in the distal end 190. The distal opening 178 is located at the distal end 190 of the guard portion 176. The guard portion 176 includes the first outer side 192 and the second inner side 194. Proximate to the first side 180 of the base 174 is the proximal opening 196 to the open chamber 198 formed by the second inner side 194 of the guard portion 176. The distal opening 178 has a diameter 197 less than the diameter 199 of the proximal opening 196. The open chamber 198 of the guard portion 176 and the open chamber 252 of the fingers 240 are fluidly connected. Accordingly, a fluid may pass through distal opening 250, through open chamber 252, through proximal opening 196, through open chamber 198, and through distal opening 178.

The guard portion 176 has a conical shape. In some embodiments, the guard portion 176 may have a hemispherical shape. However, it will be understood that in other embodiments, the guard portion 176 may have other shapes without departing from the scope of the disclosure.

The filter 68 is sized to be disposed in the open chamber 252 of the fingers 240 on the first side 180 of the base 174 of the splash guard 70 and is configured to rest against the first side 180 of the base 174 of the splash guard 70.

Assembly of the Alternative Embodiment of the Breather Cap Assembly

Having described the individual components of the breather cap assembly 60 shown in FIGS. 13-18, the assembly thereof is described. To assemble the breather cap assembly 60, the filter 68 is inserted into the open chamber 252 of the fingers 240 on the first side 180 of the base 174 of the splash guard 70. The second side 166 of the filter edge finishing 160 contacts the first side 180 of the base 174. Then the splash guard 70 is oriented with the first side 180 of the base 174 facing the second side of the breather cap 66, such that the guard portion 176 is facing away from the second side of the breather cap 66.

The breather cap 66 and the splash guard 70 are then moved closer to one another such that the fingers 240 are brought toward the second side 80 of the base 72 of the breather cap 66. After the distal ends 242 of the fingers 240 reach the distal end 214 of the second skirt 210, the protrusions 244 contact the circumferential chamfer 225 and then the first outer side 216 of the second skirt 210, causing the fingers 240 to bend radially outward slightly. When the protrusions 244 reach the groove 226 in the second skirt 210, the protrusions 244 seat into the groove 226 and the fingers 240 return to their un-bent state. At that point, the filter 68 is sandwiched between the breather cap 66 and the splash guard 70, with the first side 164 of the filter edge finishing 160 contacting the distal end 214 of the second skirt 210 and the second side 166 of the filter edge finishing 160 contacting the first side 180 of the base 174 of the splash guard 70, this contact forms a seal between the breather cap 66, the filter edge finishing 160, and the splash guard 70. The filter 68 is thus seated against the annular end surface 224 of the second skirt 210 of the breather cap 66.

Figures 17, 18:
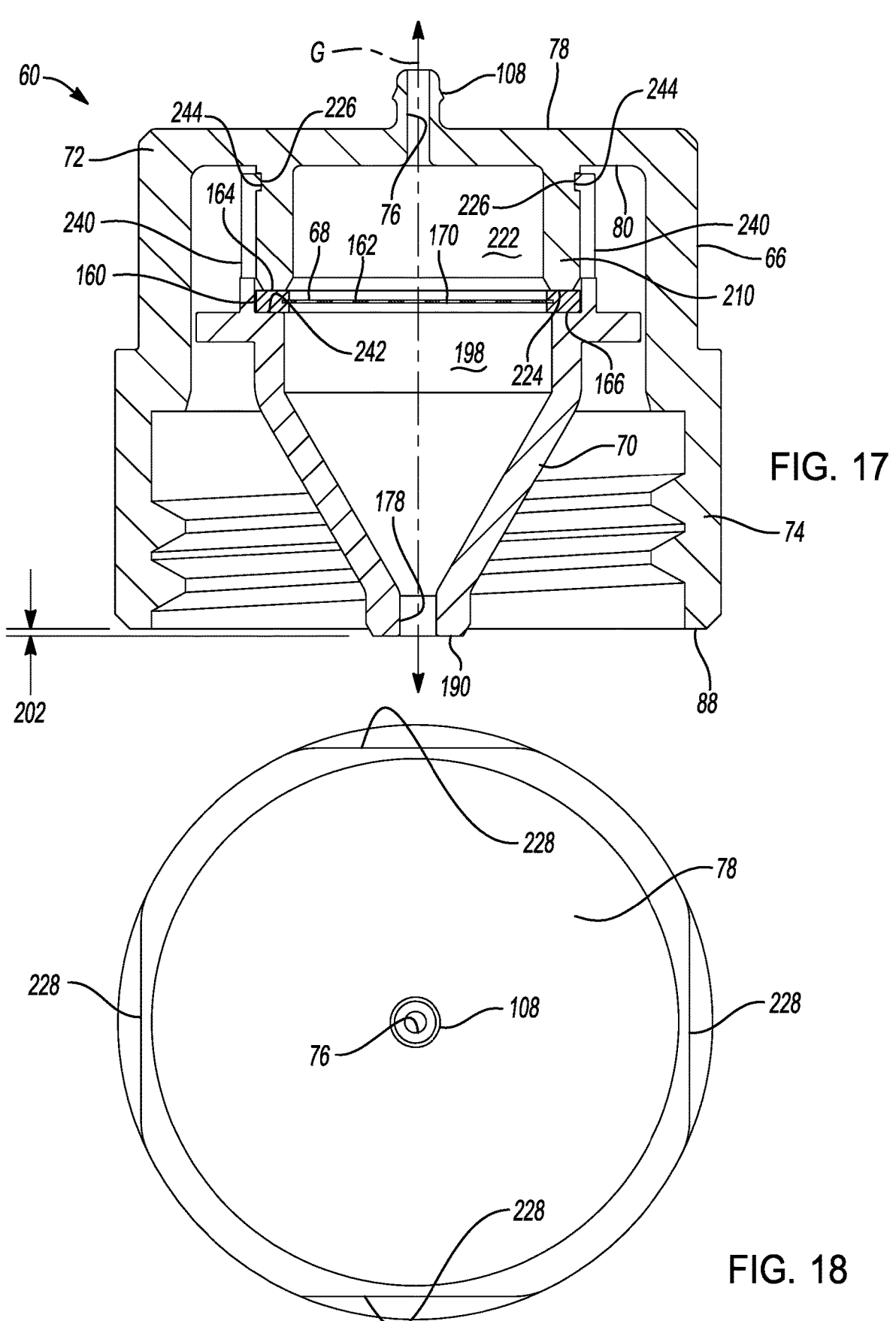
FIG. 17 is a cross-sectional view of the exemplary breather cap assembly shown in FIG. 14.
FIG. 18 is a top view of the exemplary breather cap assembly shown in FIG. 14.

In some embodiments, at least a portion of the splash guard 70 extends beyond the breather cap 66 toward the chamber 64 of the hydraulic fluid tank 58. For example, as shown in FIG. 17, when the splash guard 70 is installed in the breather cap 66, in some embodiments, the distal end 190 of splash guard 70 extends a distance 202 beyond distal end 88 of breather cap 66. However, it should be understood that in some embodiments, the distal end 190 of splash guard 70 does not extend beyond the distal end 88 of breather cap 66. In some embodiments, the distance 202 is zero. In some embodiments, the distal end 88 of breather cap 66 extends a distance beyond the distal end 190 of splash guard 70.

As shown in FIG. 13, the breather cap assembly 60 is releasably coupled to the hydraulic fluid tank 58 by the threads 110 of the breather cap 66 and the threads 112 of the neck 113 of the hydraulic fluid tank 58. When the breather cap 60 is coupled to the hydraulic fluid tank 58, the splash guard 70 is sandwiched between the neck 113 of the hydraulic fluid tank 58 and the breather cap 66. For example, the second side 182 of the base 174 of the splash guard 70 is in contact with an annular end surface 260 of the neck 113. Thus, the breather cap 66 urges the base 174 of the splash guard 70 toward the neck 113. Additionally, the neck 113 of the hydraulic fluid tank 58 may include a circumferential groove 262 into which a gasket 62 may be disposed. When the breather cap 60 is coupled to the hydraulic fluid tank 58, the second inner side 92 of the skirt 74 and the gasket 62 contact one another to form a seal between the breather cap assembly 60 and the hydraulic fluid tank 58. Additionally, in some embodiments, when the breather cap 60 is coupled to the hydraulic fluid tank 58, the second side 182 of the base 174 of the breather cap 66 and annular end surface 260 of the neck 113 of the hydraulic fluid tank 58 may cooperate to form a seal between the breather cap assembly 60 and the hydraulic fluid tank 58.

Additionally, as shown in FIGS. 13 and 17, the breather cap 66, filter 68, and filter edge finishing 160 cooperate to form a breather cap assembly 60 through which gas (e.g., air) is able to pass, and into and out of the chamber 64 of the hydraulic fluid tank 58 as shown by bi-directional arrow G. For example, gas (e.g., air) may pass through the breather cap assembly 60 via passageway 76 and open chamber 222 of the breather cap 66, openings 170 in the filter 68, and open chamber 198 and distal opening 178 of splash guard 70.

Operation of Breather Cap Assemblies

During operation of the vehicle 10 in extreme driving conditions, for example up and/or down steep inclines, off-road, or on racetracks, the hydraulic fluid sloshes around in the chamber 64 of the hydraulic fluid tank 58. When the breather cap assembly 60 is assembled with the hydraulic fluid tank 58, the splash guard 70 is located between the filter 68 and the hydraulic fluid in the hydraulic fluid tank 58 and the guard portion 176 of the splash guard 70 extends toward the chamber 64 of the hydraulic fluid tank 58. The guard portion 176 of the splash guard 70 reduces or prevents the potential for hydraulic fluid to splash and contact the filter 68. The diameter of the distal opening 178 is large enough for gas to pass through, but small enough to reduce or eliminate the potential for hydraulic fluid to pass through the distal opening 178 and contact the filter 68. Additionally, because the guard portion 176 is wider at the base 174 than at the distal end 190 and because the guard portion 176 is oriented with the distal end 190 between the hydraulic fluid and the base 174, if any hydraulic fluid were to pass through the distal opening 178 and enter into the open chamber 198 of the splash guard 70, the hydraulic fluid could by drawn by gravity down the second inner side 194 of the splash guard 70 toward the distal opening 178 and drain out of the distal opening 178.

The foregoing description is merely illustrative in nature and is in no way intended to limit the disclosure, its application, or uses. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Thus, the broad teachings of the disclosure can be implemented in a variety of forms. Therefore, while this disclosure includes particular examples, the true scope of the disclosure should not be so limited since other modifications will become apparent upon a study of the drawings, the specification, and the following claims. Thus, many other modifications and variations of the present disclosure are possible in light of the above teachings and may be practiced otherwise than as specifically described while within the scope of the appended claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A hydraulic fluid tank assembly for use with a suspension system for a vehicle, the hydraulic fluid tank assembly comprising:

a tank, the tank having a chamber configured to contain a volume of hydraulic fluid and a volume of gas; and a breather cap assembly releasably coupled to the tank, the breather cap assembly comprising:

a breather cap, the breather cap comprising:

a base having a first side and a second side opposite the first side, an outer cylindrical skirt extending a first distance from the second side of the base away from the first side, an inner side of the outer cylindrical skirt having a retaining feature adapted to releasably couple the breather cap to the tank;

an inner cylindrical skirt extending a second distance from the second side of the base away from the first side, the second distance less than the first distance; and a passageway extending through the base;

a filter, the filter having one or more openings configured to permit gas to pass therethrough; and a splash guard having a distal opening, the splash guard including one or more fingers coupled to the inner cylindrical skirt of the breather cap, with the filter being captured between the splash guard and a distal end of the inner cylindrical skirt;

the passageway of the breather cap, the openings of the filter, and the distal opening of the splash guard fluidly connected and configured to permit gas to pass therethrough to and from the chamber of the tank and the atmosphere.

2. The hydraulic fluid tank assembly of claim 1, wherein the breather cap has a groove on an outer side of the inner cylindrical skirt, and wherein the splash guard further comprises:

a base having a first side and a second side opposite the first side;

a guard portion extending from the second side of the base away from the first side; and the one or more fingers extending from the first side of the base away from the second side, each finger having a distal end and a protrusion proximate to the distal end, each protrusion seated in the groove of the breather cap.

3. The hydraulic fluid tank assembly of claim 2, wherein the one or more fingers are curved.

4. The hydraulic fluid tank assembly of claim 2, wherein the guard portion has a conical shape.

5. The hydraulic fluid tank assembly of claim 2, the inner cylindrical skirt having an annular surface at the distal end, the filter being sandwiched between the annular surface and the first side of the base of the splash guard.

6. The hydraulic fluid tank assembly of claim 1, wherein the retaining feature comprises threads configured to interface with threads on the tank.

7. The hydraulic fluid tank assembly of claim 1, the breather cap further comprising one or more features on the breather cap configured to be engaged with by a tool to engage or disengage the breather cap with the tank.

* * * * *